(12) United States Patent
Von Novak, III et al.

(10) Patent No.: US 9,985,442 B2
(45) Date of Patent: May 29, 2018

(54) WIRELESS POWER TRANSFER RECEIVER HAVING CLOSED LOOP VOLTAGE CONTROL

(71) Applicant: QUALCOMM Incorporated, San Diego, CA (US)

(72) Inventors: William Henry Von Novak, III, San Diego, CA (US); Francesco Carobolante, San Diego, CA (US); Linda Stacey Irish, San Diego, CA (US); Charles Edward Wheatley, Del Mar, CA (US); Paolo Menegoli, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 317 days.

(21) Appl. No.: 14/863,538

(22) Filed: Sep. 24, 2015

(65) Prior Publication Data

US 2017/0093167 A1    Mar. 30, 2017

(51) Int. Cl.
*H02J 5/00* (2016.01)
(52) U.S. Cl.
CPC .................................... *H02J 5/005* (2013.01)
(58) Field of Classification Search
CPC .................................... H02J 5/00; H02J 5/005
See application file for complete search history.

(56) References Cited

U.S. PATENT DOCUMENTS

2007/0145830 A1   6/2007  Lee et al.
2009/0284220 A1   11/2009 Toncich et al.
2013/0109332 A1   5/2013  Aigner
2013/0307473 A1   11/2013 Han et al.
2014/0306545 A1   10/2014 Robertson et al.
2014/0367832 A1   12/2014 Marino et al.
(Continued)

FOREIGN PATENT DOCUMENTS

JP    2013051864 A    3/2013
JP    2013243882 A    12/2013
(Continued)

OTHER PUBLICATIONS

International Search Report and Written Opinion—PCT/US2016/050852—ISA/EPO—dated Dec. 12, 2016.

*Primary Examiner* — Jeffrey Shin
(74) *Attorney, Agent, or Firm* — Smith Tempel Blaha LLC

(57) ABSTRACT

An apparatus for wirelessly receiving power via a wireless field generated by a transmitter includes a resonator configured to generate electrical current to power or charge a load based on a voltage induced in the resonator in response to the wireless field, a first variable capacitor electrically coupled to the resonator and configured to adjust a first capacitance of the first variable capacitor responsive to a first control signal, a second variable capacitor electrically coupled to the resonator and configured to adjust a second capacitance of the second variable capacitor responsive to a second control signal, and a control circuit configured to adjust and apply the first control signal and the second control signal to the first variable capacitor and the second variable capacitor, respectively, to adjust a resonant frequency of the resonator and a voltage output to the load based on an electrical characteristic indicative of a level of power output to the load.

26 Claims, 21 Drawing Sheets

(56) References Cited

U.S. PATENT DOCUMENTS

| | | |
|---|---|---|
| 2015/0035372 A1 | 2/2015 | Aioanei |
| 2015/0076920 A1 | 3/2015 | Zargham et al. |
| 2015/0244179 A1 | 8/2015 | Ritter et al. |
| 2016/0254679 A1* | 9/2016 | Liu .................. H02J 50/12 307/104 |
| 2016/0352390 A1 | 12/2016 | Park et al. |
| 2017/0093168 A1 | 3/2017 | Von Novak, III et al. |

FOREIGN PATENT DOCUMENTS

| | | |
|---|---|---|
| JP | 2014143776 A | 8/2014 |
| WO | 2015119511 A1 | 8/2015 |

\* cited by examiner

WIRELESS POWER TRANSFER RECEIVER HAVING CLOSED LOOP VOLTAGE CONTROL

FIELD

The present disclosure relates generally to wireless power. More specifically, the disclosure is directed to a wireless power receiver having closed loop voltage control.

BACKGROUND

An increasing number and variety of electronic devices are powered via rechargeable batteries. Such devices include mobile phones, portable music players, laptop computers, tablet computers, computer peripheral devices, communication devices (e.g., Bluetooth devices), digital cameras, hearing aids, and the like. While battery technology has improved, battery-powered electronic devices increasingly require and consume greater amounts of power, thereby often requiring recharging. Rechargeable devices are often charged via wired connections that require cables or other similar connectors that are physically connected to a power supply. Cables and similar connectors may sometimes be inconvenient or cumbersome and have other drawbacks. Wireless charging systems that are capable of transferring power in free space to be used to charge rechargeable electronic devices may overcome some of the deficiencies of wired charging solutions. As such, wireless charging systems and methods that efficiently and safely transfer power for charging rechargeable electronic devices are desirable.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the disclosure provides an apparatus for wirelessly receiving power via a wireless field generated by a transmitter including a resonator configured to generate electrical current to power or charge a load based on a voltage induced in the resonator in response to the wireless field, a first variable capacitor electrically coupled to the resonator and configured to adjust a first capacitance of the first variable capacitor responsive to a first control signal, a second variable capacitor electrically coupled to the resonator and configured to adjust a second capacitance of the second variable capacitor responsive to a second control signal, and a control circuit configured to adjust and apply the first control signal and the second control signal to the first variable capacitor and the second variable capacitor, respectively, to adjust a resonant frequency of the resonator and a voltage output to the load based on an electrical characteristic indicative of a level of power output to the load.

Another aspect of the disclosure provides a method for wirelessly receiving power via a wireless field generated by a transmitter including generating an electrical current to power or charge a load based on a voltage induced in a resonator in response to a wireless field, adjusting a first variable capacitance responsive to a first control signal, adjusting a second variable capacitance responsive to a second control signal, and applying the first control signal and the second control signal to the first variable capacitance and the second variable capacitance, respectively, to adjust a resonant frequency of the resonator and a voltage output to the load based on an electrical characteristic indicative of a level of power output to the load.

Another aspect of the disclosure provides a device for wirelessly receiving power via a wireless field generated by a transmitter including means for generating an electrical current to power or charge a load based on a voltage induced in a resonator in response to a wireless field, means for adjusting a first variable capacitance responsive to a first control signal, means for adjusting a second variable capacitance responsive to a second control signal, and means for applying the first control signal and the second control signal to the first variable capacitance and the second variable capacitance, respectively, to adjust a resonant frequency of the resonator and a voltage output to the load based on an electrical characteristic indicative of a level of power output to the load.

Another aspect of the disclosure provides an apparatus for wirelessly receiving power via a wireless field generated by a transmitter including a resonator configured to generate electrical current to power or charge a load based on a voltage induced in the resonator in response to the wireless field, a first variable capacitor electrically coupled to the resonator and configured to adjust a first capacitance of the first variable capacitor responsive to a first control signal, a second variable capacitor electrically coupled to the resonator and configured to adjust a second capacitance of the second variable capacitor responsive to a second control signal, and a closed loop feedback circuit configured to adjust and apply the first control signal and the second control signal to the first variable capacitor and the second variable capacitor, respectively, to adjust a resonant frequency of the resonator and a voltage output to the load based on an electrical characteristic indicative of a level of power output to the load and a reference signal.

Another aspect of the disclosure provides an apparatus for wirelessly receiving power via a wireless field generated by a transmitter, including a resonator configured to generate electrical current to power or charge a load based on a voltage induced in the resonator in response to the wireless field, at least one variable capacitor electrically coupled to the resonator and configured to adjust a first capacitance of the at least one variable capacitor responsive to a first control signal, and a control circuit configured to adjust and apply the first control signal to the at least one variable capacitor to simultaneously adjust a resonant frequency of the resonator and a current output to the load based on an electrical characteristic indicative of a level of power output to the load.

Another aspect of the disclosure provides a method for wirelessly receiving power via a wireless field generated by a transmitter including generating an electrical current to power or charge a load based on a voltage induced in a resonator in response to the wireless field, adjusting a first capacitance of at least one variable capacitor responsive to a first control signal, and applying the first control signal to the at least one variable capacitor to simultaneously adjust a resonant frequency of the resonator and a current output to the load based on an electrical characteristic indicative of a level of power output to the load.

Another aspect of the disclosure provides an apparatus for wirelessly receiving power via a wireless field generated by a transmitter including a resonator configured to generate electrical current to power or charge a load based on a voltage induced in the resonator in response to the wireless field, at least one controllable element configured to simultaneously adjust a resonant frequency and a voltage output of the wireless power receiver in response to at least one control signal, and a control circuit configured to adjust and apply the at least one control signal to adjust a resonant frequency of the resonator and a voltage output to the load based on an electrical characteristic indicative of a level of power output to the load.

Another aspect of the disclosure provides a method for wirelessly receiving power via a wireless field generated by a transmitter including generating electrical current to power or charge a load based on a voltage induced in a resonator in response to the wireless field, simultaneously adjusting a resonant frequency and a voltage output of a wireless power receiver in response to at least one control signal, and applying the at least one control signal to adjust a resonant frequency of the resonator and a voltage output to the load based on an electrical characteristic indicative of a level of power output to the load.

BRIEF DESCRIPTION OF THE DRAWINGS

In the figures, like reference numerals refer to like parts throughout the various views unless otherwise indicated. For reference numerals with letter character designations such as "102a" or "102b", the letter character designations may differentiate two like parts or elements present in the same figure. Letter character designations for reference numerals may be omitted when it is intended that a reference numeral encompass all parts having the same reference numeral in all figures.

Figure 1:
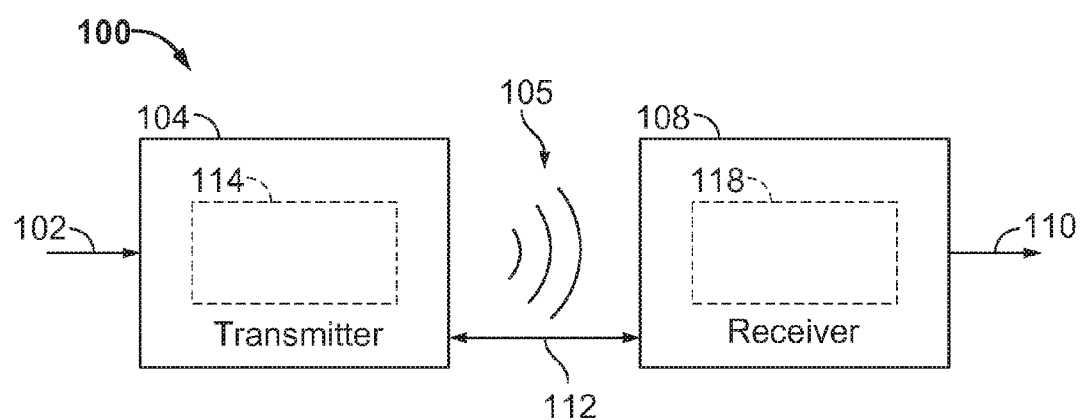
FIG. 1 is a functional block diagram of an exemplary wireless power transfer system, in accordance with exemplary embodiments of the invention.

The various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

The detailed description set forth below in connection with the appended drawings is intended as a description of exemplary embodiments of the invention and is not intended to represent the only embodiments in which the invention may be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. In some instances, some devices are shown in block diagram form.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal). Wirelessly transferring power may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field) may be received, captured by, or coupled by a "receiving antenna" to achieve power transfer.

Controlling the resonant frequency of a receiving antenna helps to control the magnetic coupling between a transmit antenna and the receiving antenna. One aspect of controlling the magnetic coupling between a transmit antenna and the receiving antenna allows control over the voltage received by a wireless power charge-receiving device.

While magnetic coupling between a transmit resonator and a receive resonator is relatively higher under resonant conditions than it is under non-resonant conditions, it may not be completely uniform. Both magnetic coupling and mutual inductance change with location and Z-separation. Z-separation refers to the distance between the transmit resonator and the receive resonator. Reducing mutual inductance results in lower voltage at the receiver, and lower magnetic coupling results in lower efficiencies and lower power transfer capability. One of the reasons that magnetic coupling declines is that the two resonators "detune" each other, causing a shift in resonant frequency away from resonance. In addition, the lower voltage makes it difficult to design a receiver that is efficient, since a wide variation in input voltage makes receive power converter design difficult and inefficient.

The disclosure describes a wireless power receiver having closed loop voltage control with variable capacitors. The closed loop voltage control comprises a feedback system that provides control signals to adjust variable capacitances in the wireless power receiver. Adjusting the variable capacitances in the wireless power receiver can control the resonant frequency of the receiving antenna and the voltage developed by the wireless power receiver for power output regulation.

FIG. 1 is a functional block diagram of an exemplary wireless power transfer system 100, in accordance with exemplary embodiments of the invention. Input power 102 may be provided to a transmitter 104 from a power source (not shown) for generating a field 105 (e.g., magnetic or species of electromagnetic) for providing energy transfer. A receiver 108 may couple to the field 105 and generate output power 110 for storing or consumption by a device (not shown) coupled to the output power 110. Both the transmitter 104 and the receiver 108 are separated by a distance 112. In one exemplary embodiment, transmitter 104 and receiver 108 are configured according to a mutual resonant relationship. When the resonant frequency of receiver 108 and the resonant frequency of transmitter 104 are substantially the same or very close, transmission losses between the transmitter 104 and the receiver 108 are reduced. As such, wireless power transfer may be provided over larger distances in contrast to purely inductive solutions that may require large coils to be very close (e.g., millimeters). Resonant inductive coupling techniques may thus allow for improved efficiency and power transfer over various distances and with a variety of inductive coil configurations.

The receiver 108 may receive power when the receiver 108 is located in an energy field 105 produced by the transmitter 104. The field 105 corresponds to a region where energy output by the transmitter 104 may be captured by a receiver 108. The transmitter 104 may include a transmit antenna 114 (that may also be referred to herein as a coil) for outputting an energy transmission. The receiver 108 further includes a receive antenna 118 (that may also be referred to herein as a coil) for receiving or capturing energy from the energy transmission. In some cases, the field 105 may correspond to the "near-field" of the transmitter 104. The near-field may correspond to a region in which there are strong reactive fields resulting from the currents and charges in the transmit antenna 114 that minimally radiate power away from the transmit antenna 114. In some cases the near-field may correspond to a region that is within about one wavelength (or a fraction thereof) of the transmit antenna 114.

In accordance with the above therefore, in accordance with more particular embodiments, the transmitter 104 may be configured to output a time varying magnetic field 105 with a frequency corresponding to the resonant frequency of the transmit antenna 114. When the receiver is within the field 105, the time varying magnetic field 105 may induce a voltage in the receive antenna 118 that causes an electrical current to flow through the receive antenna 118. As described above, if the receive antenna 118 is configured to be resonant at the frequency of the transmit antenna 114, energy may be more efficiently transferred. The AC signal induced in the receive antenna 118 may be rectified to produce a DC signal that may be provided to charge or to power a load.

Figure 2:
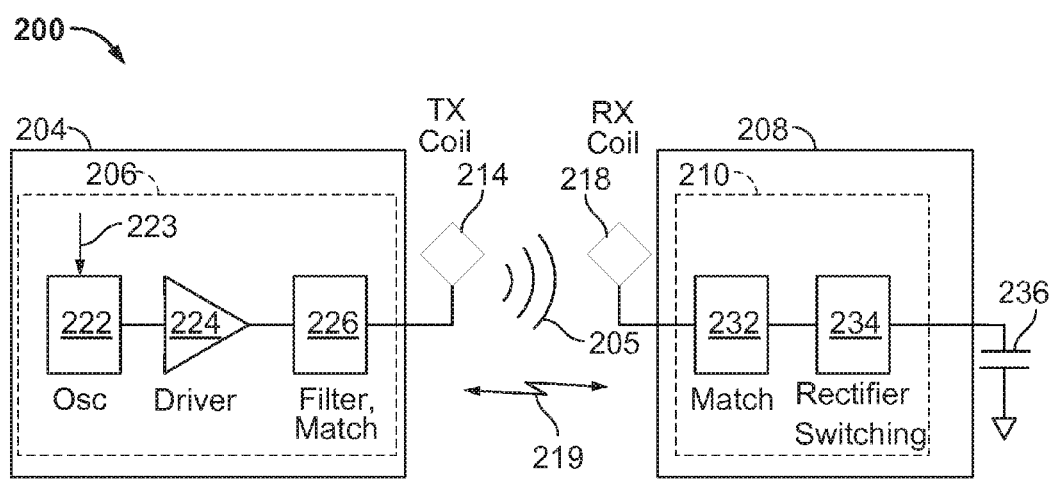
FIG. 2 is a functional block diagram of exemplary components that may be used in the wireless power transfer system of FIG. 1, in accordance with various exemplary embodiments of the invention.

FIG. 2 is a functional block diagram of exemplary components in a wireless power transfer system 200 that may be used in the wireless power transfer system 100 of FIG. 1, in accordance with various exemplary embodiments of the invention. The transmitter 204 may include transmit circuitry 206 that may include an oscillator 222, a driver circuit 224, and a filter and matching circuit 226. The oscillator 222 may be configured to generate a signal at a desired frequency, such as 468.75 KHz, 6.78 MHz or 13.56 MHz, that may be adjusted in response to a frequency control signal 223. The oscillator signal may be provided to a driver circuit 224 configured to drive the transmit antenna 214 at, for example, a resonant frequency of the transmit antenna 214. The driver circuit 224 may be a switching amplifier configured to receive a square wave from the oscillator 222 and output a sine wave. For example, the driver circuit 224 may be a class E amplifier. A filter and matching circuit 226 may be also included to filter out harmonics or other unwanted frequencies and match the impedance of the transmitter 204 to the impedance of the transmit antenna 214. As a result of driving the transmit antenna 214, the transmitter 204 may wirelessly output power at a level sufficient for charging or powering an electronic device. As one example, the power provided may be for example on the order of 300 milliWatts to 5 Watts or 5 Watts to 40 Watts to power or charge different devices with different power requirements. Higher or lower power levels may also be provided.

The receiver 208 may include receive circuitry 210 that may include a matching circuit 232 and a rectifier and switching circuit 234 to generate a DC power output from an AC power input to charge a battery 236 as shown in FIG. 2 or to power a device (not shown) coupled to the receiver 208. The matching circuit 232 may be included to match the impedance of the receive circuitry 210 to the impedance of the receive antenna 218. The receiver 208 and transmitter 204 may additionally communicate on a separate communication channel 219 (e.g., Bluetooth, zigbee, cellular, etc.). The receiver 208 and transmitter 204 may alternatively communicate via in-band signaling using characteristics of the wireless field 205.

The receiver 208 may initially have a selectively disable associated load (e.g., battery 236), and may be configured to determine whether an amount of power transmitted by transmitter 204 and received by receiver 208 is appropriate for charging a battery 236. Further, receiver 208 may be configured to enable a load (e.g., battery 236) upon determining that the amount of power is appropriate.

Figure 3:
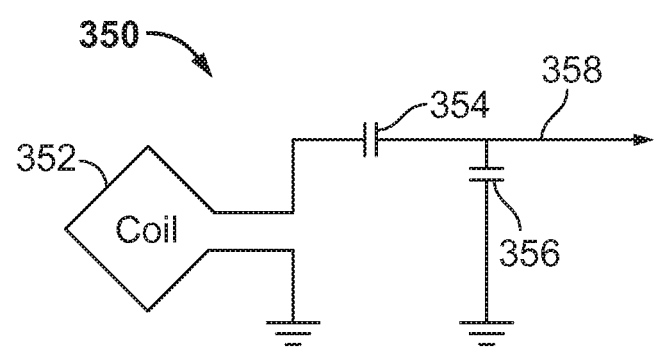
FIG. 3 is a schematic diagram of a portion of transmit circuitry or receive circuitry of FIG. 2 including a transmit or receive antenna, in accordance with exemplary embodiments of the invention.

FIG. 3 is a schematic diagram of a portion of transmit circuitry 206 or receive circuitry 210 of FIG. 2 including a transmit or receive antenna 352, in accordance with exemplary embodiments of the invention. As illustrated in FIG. 3, transmit or receive circuitry 350 used in exemplary embodiments including those described below may include an antenna 352. The antenna 352 may also be referred to or be configured as a "loop" antenna 352. The antenna 352 may also be referred to herein or be configured as a "magnetic" antenna or an induction coil. The term "antenna" generally refers to a component that may wirelessly output or receive energy for coupling to another "antenna." The antenna 352 may also be referred to as a coil of a type that is configured to wirelessly output or receive power. As used herein, an antenna 352 is an example of a "power transfer component" of a type that is configured to wirelessly output and/or receive power. The antenna 352 may be configured to include an air core or a physical core such as a ferrite core (not shown).

The antenna 352 may form a portion of a resonant circuit configured to resonate at a resonant frequency. The resonant frequency of the loop or magnetic antenna 352 is based on the inductance and capacitance. Inductance may be simply the inductance created by the antenna 352, whereas, capacitance may be added to create a resonant structure (e.g., a capacitor may be electrically connected to the antenna 352 in series or in parallel) at a desired resonant frequency. As a non-limiting example, capacitor 354 and capacitor 356 may be added to the transmit or receive circuitry 350 to create a resonant circuit that resonates at a desired frequency of operation. For larger diameter antennas, the size of capacitance needed to sustain resonance may decrease as the diameter or inductance of the loop increases. As the diameter of the antenna increases, the efficient energy transfer area of the near-field may increase. Other resonant circuits formed using other components are also possible. As another non-limiting example, a capacitor (not shown) may be placed in parallel between the two terminals of the antenna 352. For transmit antennas, a signal 358 with a frequency that substantially corresponds to the resonant frequency of the antenna 352 may be an input to the antenna 352. For receive antennas, the signal 358 may be the output that may be rectified and used to power or charge a load.

Figure 4:
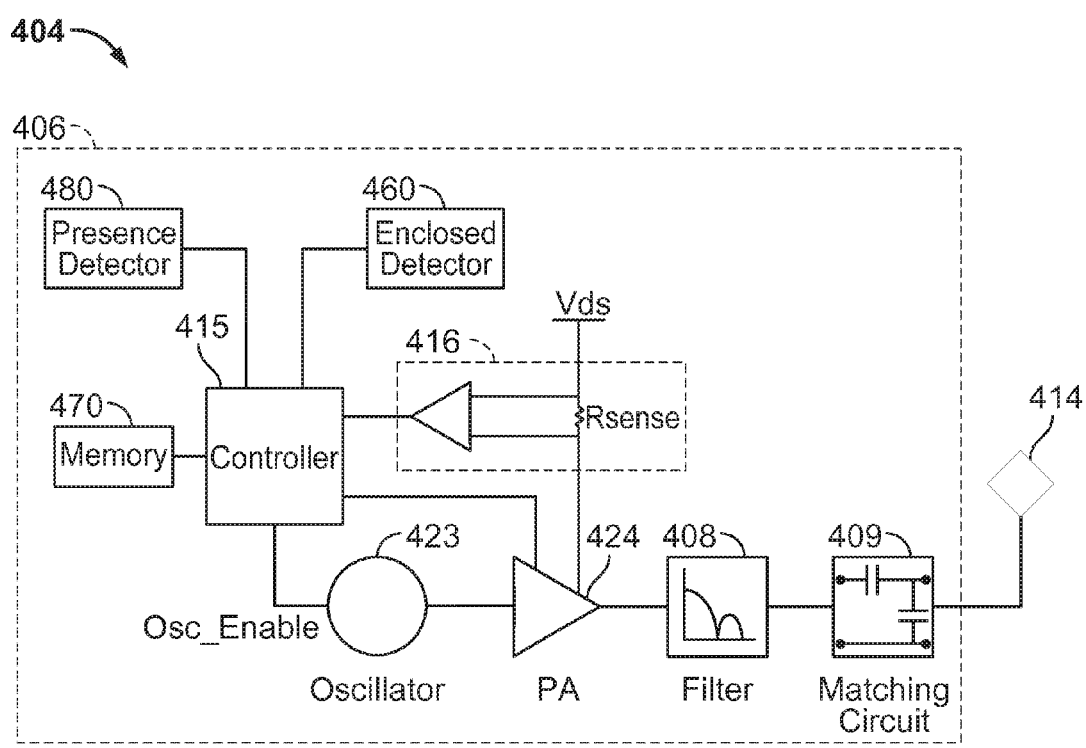
FIG. 4 is a functional block diagram of a transmitter that may be used in the wireless power transfer system of FIG. 1, in accordance with exemplary embodiments of the invention.

FIG. 4 is a functional block diagram of a transmitter 404 that may be used in the wireless power transfer system of FIG. 1, in accordance with exemplary embodiments of the invention. The transmitter 404 may include transmit circuitry 406 and a transmit antenna 414. The transmit antenna 414 may be the antenna 352 as shown in FIG. 3. The transmit antenna 414 may be configured as the transmit antenna 214 as described above in reference to FIG. 2. In some implementations, the transmit antenna 414 may be a coil (e.g., an induction coil). In some implementations, the transmit antenna 414 may be associated with a larger structure, such as a pad, table, mat, lamp, or other stationary configuration. Transmit circuitry 406 may provide power to the transmit antenna 414 by providing an oscillating signal resulting in generation of energy (e.g., magnetic flux) about the transmit antenna 414. Transmitter 404 may operate at any suitable frequency. By way of example, transmitter 404 may operate at the 6.78 MHz ISM band.

Transmit circuitry 406 may include a fixed impedance matching circuit 409 for matching the impedance of the transmit circuitry 406 (e.g., 50 ohms) to the impedance of the transmit antenna 414 and a low pass filter (LPF) 408 configured to reduce harmonic emissions to levels to prevent self-jamming of devices coupled to receivers 108 (FIG. 1). Other exemplary embodiments may include different filter topologies, including but not limited to, notch filters that attenuate specific frequencies while passing others and may include an adaptive impedance match, that may be varied based on measurable transmit metrics, such as output power to the antenna 414 or DC current drawn by the driver circuit 424. Transmit circuitry 406 further includes a driver circuit 424 configured to drive a signal as determined by an oscillator 423. The transmit circuitry 406 may be comprised of discrete devices or circuits, or alternately, may be comprised of an integrated assembly.

Transmit circuitry 406 may further include a controller 415 for selectively enabling the oscillator 423 during transmit phases (or duty cycles) for specific receivers, for adjusting the frequency or phase of the oscillator 423, and for adjusting the output power level for implementing a communication protocol for interacting with neighboring devices through their attached receivers. It is noted that the controller 415 may also be referred to herein as a processor. The controller 415 may be coupled to a memory 470. Adjustment of oscillator phase and related circuitry in the transmission path may allow for reduction of out of band emissions, especially when transitioning from one frequency to another.

The transmit circuitry 406 may further include a load sensing circuit 416 for detecting the presence or absence of active receivers in the vicinity of the near-field generated by transmit antenna 414. By way of example, a load sensing circuit 416 monitors the current flowing to the driver circuit 424, that may be affected by the presence or absence of active receivers in the vicinity of the field generated by transmit antenna 414 as will be further described below. Detection of changes to the loading on the driver circuit 424 are monitored by controller 415 for use in determining whether to enable the oscillator 423 for transmitting energy and to communicate with an active receiver.

The transmit antenna 414 may be implemented with a Litz wire or as an antenna strip with the thickness, width and metal type selected to keep resistive losses low.

The transmitter 404 may gather and track information about the whereabouts and status of receiver devices that may be associated with the transmitter 404. Thus, the transmit circuitry 406 may include a presence detector 480, an enclosed detector 460, or a combination thereof, connected to the controller 415 (also referred to as a processor herein). The controller 415 may adjust an amount of power delivered by the driver circuit 424 in response to presence signals from the presence detector 480 and the enclosed detector 460. The transmitter 404 may receive power through a number of power sources, such as, for example, an AC-DC converter (not shown) to convert AC power present in a building, a DC-DC converter (not shown) to convert a DC power source to a voltage suitable for the transmitter 404, or directly from a DC power source (not shown).

As a non-limiting example, the presence detector 480 may be a motion detector utilized to sense the initial presence of a device to be charged that is inserted into the coverage area of the transmitter 404. After detection, the transmitter 404 may be turned on and the power received by the device may be used to toggle a switch on the receiver device in a pre-determined manner, which in turn results in changes to the driving point impedance of the transmitter 404.

As another non-limiting example, the presence detector 480 may be a detector capable of detecting a human, for example, by infrared detection, motion detection, or other suitable means. In some exemplary embodiments, there may be regulations limiting the amount of power that a transmit antenna 414 may transmit at a specific frequency. In some cases, these regulations are meant to protect humans from electromagnetic radiation. However, there may be environments where a transmit antenna 414 is placed in areas not occupied by humans, or occupied infrequently by humans, such as, for example, garages, factory floors, shops, and the like. If these environments are free from humans, it may be permissible to increase the power output of the transmit antenna 414 above the normal power restrictions regulations. In other words, the controller 415 may adjust the power output of the transmit antenna 414 to a regulatory level or lower in response to human presence and adjust the power output of the transmit antenna 414 to a level above the regulatory level when a human is outside a regulatory distance from the wireless charging field of the transmit antenna 414.

As a non-limiting example, the enclosed detector 460 (may also be referred to herein as an enclosed compartment detector or an enclosed space detector) may be a device such as a sense switch for determining when an enclosure is in a closed or open state. When a transmitter is in an enclosure that is in an enclosed state, a power level of the transmitter may be increased.

In exemplary embodiments, a method by which the transmitter 404 does not remain on indefinitely may be used. In this case, the transmitter 404 may be programmed to shut off after a user-determined amount of time. This feature prevents the transmitter 404, notably the driver circuit 424, from running long after the wireless devices in its perimeter are fully charged. This event may be due to the failure of the circuit to detect the signal sent from either the repeater or the receive antenna 218 that a device is fully charged. To prevent the transmitter 404 from automatically shutting down if another device is placed in its perimeter, the transmitter 404 automatic shut off feature may be activated only after a set period of lack of motion detected in its perimeter. The user may be able to determine the inactivity time interval, and change it as desired. As a non-limiting example, the time interval may be longer than that needed to fully charge a specific type of wireless device under the assumption of the device being initially fully discharged.

Figure 5:
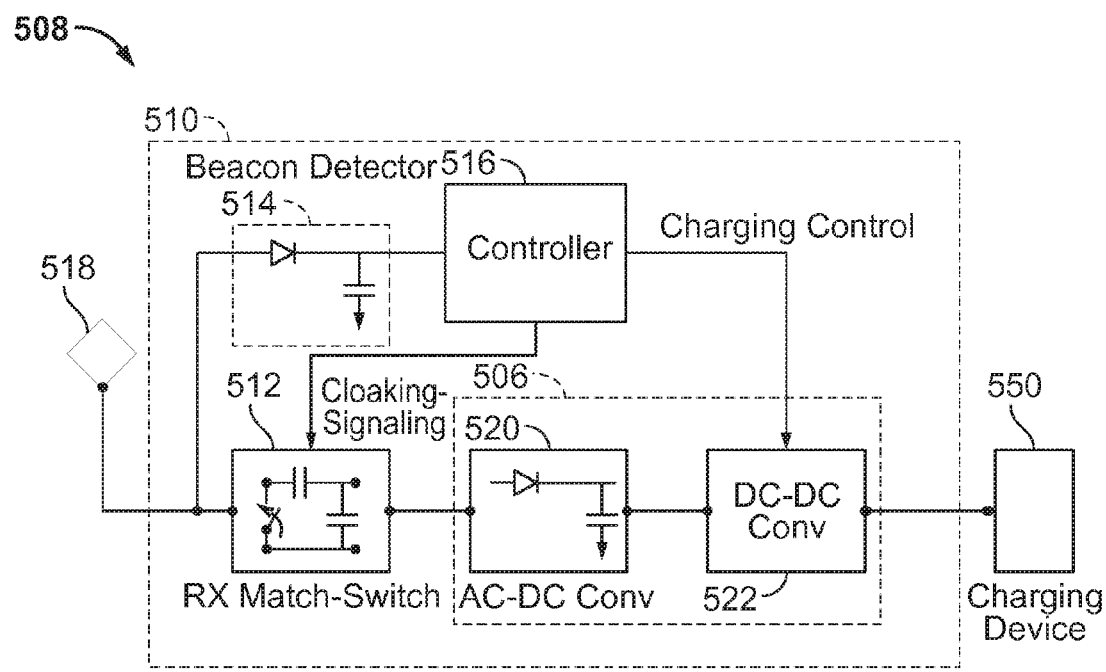
FIG. 5 is a functional block diagram of a receiver that may be used in the wireless power transfer system of FIG. 1, in accordance with exemplary embodiments of the invention.

FIG. 5 is a functional block diagram of a receiver 508 that may be used in the wireless power transfer system of FIG. 1, in accordance with exemplary embodiments of the invention. The receiver 508 includes receive circuitry 510 that may include a receive antenna 518. Receiver 508 further couples to device 550 for providing received power thereto. It should be noted that receiver 508 is illustrated as being external to device 550 but may be integrated into device 550. Energy may be propagated wirelessly to receive antenna 518 and then coupled through the rest of the receive circuitry 510 to device 550. By way of example, the charging device may include devices such as mobile phones, portable music players, laptop computers, tablet computers, computer peripheral devices, communication devices (e.g., Bluetooth devices), digital cameras, hearing aids (and other medical devices), wearable devices, and the like.

Receive antenna 518 may be tuned to resonate at the same frequency, or within a specified range of frequencies, as transmit antenna 414 (FIG. 4). Receive antenna 518 may be similarly dimensioned with transmit antenna 414 or may be differently sized based upon the dimensions of the associated device 550. By way of example, device 550 may be a portable electronic device having diametric or length dimension smaller than the diameter or length of transmit antenna 414. In such an example, receive antenna 518 may be implemented as a multi-turn coil in order to reduce the capacitance value of a tuning capacitor (not shown) and increase the receive coil's impedance. By way of example, receive antenna 518 may be placed around the substantial circumference of device 550 in order to maximize the antenna diameter and reduce the number of loop turns (i.e., windings) of the receive antenna 518 and the inter-winding capacitance.

Receive circuitry 510 may provide an impedance match to the receive antenna 518. Receive circuitry 510 includes power conversion circuitry 506 for converting received energy into charging power for use by the device 550. Power conversion circuitry 506 includes an AC-to-DC converter 520 and may also include a DC-to-DC converter 522. AC-to-DC converter 520 rectifies the energy signal received at receive antenna 518 into a non-alternating power with an output voltage. The DC-to-DC converter 522 (or other power regulator) converts the rectified energy signal into an energy potential (e.g., voltage) that is compatible with device 550 with an output voltage and output current. Various AC-to-DC converters are contemplated, including partial and full rectifiers, regulators, bridges, doublers, as well as linear and switching converters.

Receive circuitry 510 may further include RX matching and switching circuitry 512 for connecting receive antenna 518 to the power conversion circuitry 506 or alternatively for disconnecting the power conversion circuitry 506. Disconnecting receive antenna 518 from power conversion circuitry 506 not only suspends charging of device 550, but also changes the "load" as "seen" by the transmitter 404 (FIG. 2).

When multiple receivers 508 are present in a transmitter's near-field, it may be desirable to adjust the loading and unloading of one or more receivers to enable other receivers to more efficiently couple to the transmitter. A receiver 508 may also be cloaked in order to eliminate coupling to other nearby receivers or to reduce loading on nearby transmitters. This "unloading" of a receiver is also known herein as a "cloaking." Furthermore, this switching between unloading and loading controlled by receiver 508 and detected by transmitter 404 may provide a communication mechanism from receiver 508 to transmitter 404. Additionally, a protocol may be associated with the switching that enables the sending of a message from receiver 508 to transmitter 404. By way of example, a switching speed may be on the order of 100 µsec.

In an exemplary embodiment, communication between the transmitter 404 and the receiver 508 may take place either via an "out-of-band" separate communication channel/antenna or via "in-band" communication that may occur via modulation of the field used for power transfer.

Receive circuitry 510 may further include signaling detector and beacon circuitry 514 used to identify received energy fluctuations that may correspond to informational signaling from the transmitter to the receiver. Furthermore, signaling and beacon circuitry 514 may also be used to detect the transmission of a reduced signal energy (i.e., a beacon signal) and to rectify the reduced signal energy into a nominal power for awakening either un-powered or power-depleted circuits within receive circuitry 510 in order to configure receive circuitry 510 for wireless charging.

Receive circuitry 510 further includes controller 516 for coordinating the processes of receiver 508 described herein including the control of RX matching and switching circuitry 512 described herein. It is noted that the controller 516 may also be referred to herein as a processor. Cloaking of receiver 508 may also occur upon the occurrence of other events including detection of an external wired charging source (e.g., wall/USB power) providing charging power to device 550. Controller 516, in addition to controlling the cloaking of the receiver, may also monitor beacon circuitry 514 to determine a beacon state and extract messages sent from the transmitter 404. Controller 516 may also adjust the DC-to-DC converter 522 for improved performance.

Figure 6:
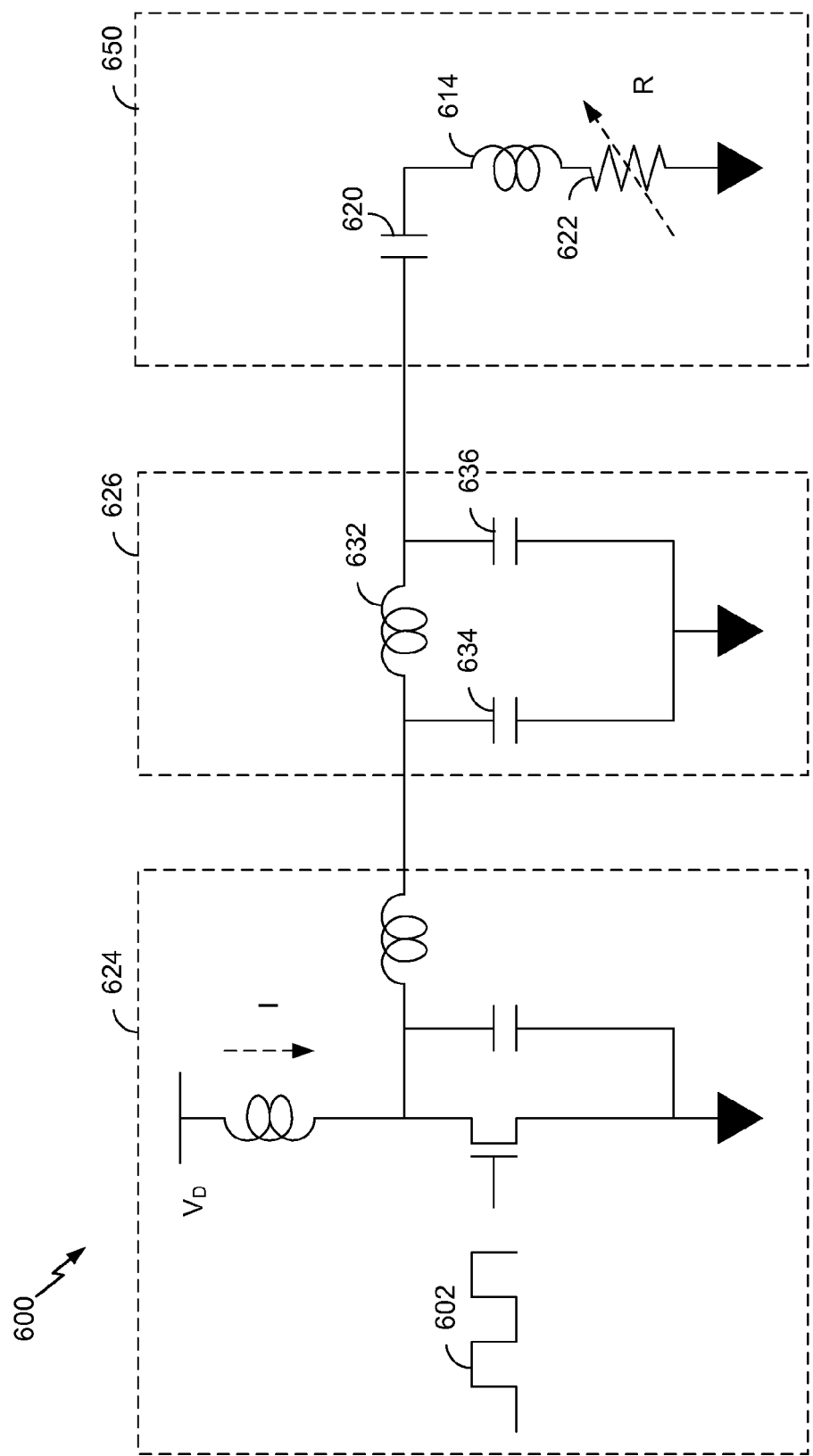
FIG. 6 is a schematic diagram of a portion of transmit circuitry that may be used in the transmit circuitry of FIG. 4.

FIG. 6 is a schematic diagram of a portion of transmit circuitry 600 that may be used in the transmit circuitry 406 of FIG. 4. The transmit circuitry 600 may include a driver circuit 624 as described above in FIG. 4. As described above, the driver circuit 624 may be a switching amplifier that may be configured to receive a square wave and output a sine wave to be provided to the transmit circuit 650. In some cases the driver circuit 624 may be referred to as an amplifier circuit. The driver circuit 624 is shown as a class E amplifier, however, any suitable driver circuit 624 may be used in accordance with embodiments of the invention. The driver circuit 624 may be driven by an input signal 602 from an oscillator 423 as shown in FIG. 4. The driver circuit 624 may also be provided with a drive voltage $V_D$ that is configured to control the maximum power that may be delivered through a transmit circuit 650. To eliminate or reduce harmonics, the transmit circuitry 600 may include a filter circuit 626. The filter circuit 626 may be a three pole (capacitor 634, inductor 632, and capacitor 636) low pass filter circuit 626.

The signal output by the filter circuit 626 may be provided to a transmit circuit 650 comprising an antenna 614. The transmit circuit 650 may include a series resonant circuit having a capacitance 620 and inductance (e.g., that may be due to the inductance or capacitance of the antenna or to an additional capacitor component) that may resonate at a frequency of the filtered signal provided by the driver circuit 624. The load of the transmit circuit 650 may be represented by the variable resistor 622. The load may be a function of a wireless power receiver 508 that is positioned to receive power from the transmit circuit 650.

Wireless charging systems achieve relatively high coupling by using transmitter and receiver coils tuned at or near resonance. Tuning the transmit and receive coils to a resonant frequency allows relatively high power transfer efficiencies without sacrificing device placement freedom or device size freedom. Further, it is desirable to maintain sufficient receiver power output while accommodating a wide variation in coupling and detuning effects due to variable positioning or other changing environmental conditions.

In an exemplary embodiment, it is desirable to have the ability to control the output power provided by a wireless power receiver. In an exemplary embodiment, controlling the output power provided by a wireless power receiver controls the amount of charge provided to a charge-receiving device coupled to the wireless power receiver 508. In an exemplary embodiment, controlling the output power provided by a wireless power receiver may comprise regulating the voltage and/or the current at an output of a wireless power receiver. Generally, a wireless power receiver includes a way of converting the received power from an AC signal to a direct current (DC) signal. Regulating the load voltage or current, and in particular the charging of a battery coupled to the wireless power receiver, is typically performed by a linear or switching DC-DC converter and dedicated circuitry that transform the energy from the output of the rectifier of the wireless power receiver to the desired load. However such DC-DC converters have shortcomings. For example, DC-DC converters are inefficient and costly. Another challenge with using such circuits is that they have to be able to operate within large ranges of induced voltage and output voltage, as a result of receiving power over a magnetic field. It is desirable for a wireless power receiver circuit to operate near the maximum power transfer point without making the system inefficient. It is common to utilize means for impedance scaling in order to obtain high efficiency, however at low induced voltage levels and high battery voltage, the ability for the receiver to transfer the desired power is diminished unless multiple impedance scaling factors are used for different conditions. Further, the current in the receive antenna may grow quite large and increase the total dissipation in the wireless power receiver to unacceptable levels. It is therefore desirable to eliminate a DC-DC converter from a wireless power receiver while regulating the output power generated by the wireless power receiver, and to find ways to simplify the power receiver circuit, eliminating the need for variable impedance scaling circuits, while operating at high efficiency.

In an exemplary embodiment, a closed loop feedback circuit is coupled to one or more variable capacitors that can be configured to adjust one or more of a resonant frequency of a power receiver resonator and an output voltage of the wireless power receiver (e.g., adjust the output voltage to substantially continuously maintain the output voltage within a constrained range or substantially constant).

Figure 7:
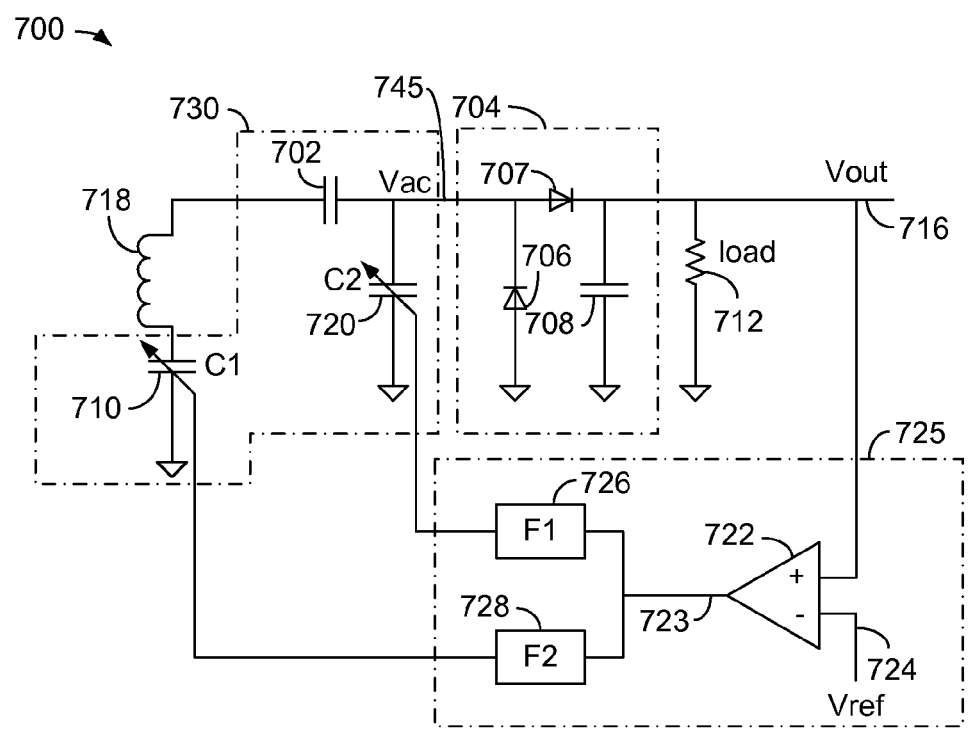
FIG. 7 is a block diagram showing an exemplary embodiment of a portion of a wireless power receiver including closed loop voltage control.

FIG. 7 is a block diagram showing an exemplary embodiment of a portion of a wireless power receiver 700 including closed loop voltage control. The wireless power receiver 700 comprises portions of the receiver 508 of FIG. 5 that are relevant to the description of the closed loop voltage control described herein.

In an exemplary embodiment, the wireless power receiver 700 comprises a receive resonator 718 coupled to a resonant tank circuit 730. In an exemplary embodiment, the resonant tank circuit 730 comprises fixed value and adjustable value components that can be configured to allow the resonator 718 to operate at a resonant frequency.

In an exemplary embodiment, the resonant tank circuit 730 is configured as a half bridge circuit comprising a capacitor 702, a first variable capacitor 710, and a second variable capacitor 720. In an exemplary embodiment, the term "resonator" is intended to apply to an antenna or a coil that is coupled to one or more capacitors such that the resonant frequency of the resonator is, at least in part, determined by the value of the capacitor or capacitors to which it is coupled. In an exemplary embodiment, the variable capacitor 710 can be a variable, or adjustable capacitor, such as a voltage controlled capacitor, or other variable or adjustable capacitor. In an exemplary embodiment, the variable capacitor 710 can be used to tune the resonant frequency of the receive resonator 718 responsive to a control signal provided by the feedback circuit 725. In an exemplary embodiment, the feedback circuit 725 is a closed loop feedback circuit. The tuning of the wireless power receiver 700 can be affected by the location of the wireless power receiver 700 on a wireless charging surface, such as a transmitter pad, by nearby metal, and by the presence of other receivers, devices, etc. Using the variable capacitor 710 to tune the resonant frequency of the receive resonator 718 can help increase magnetic coupling between a transmit resonator and the receive resonator 718 and thus increase total power available from a given wireless power system.

In an exemplary embodiment, the wireless power receiver 700 also comprises a capacitor 702, a variable, or adjustable capacitor 720, a rectifier circuit 704, a resistor 712 representing a load, and a feedback circuit 725. The capacitor 702 contributes to the resonance of the receive resonator 718.

In an exemplary embodiment, the variable capacitor 720 can be a variable, or adjustable capacitor, such as a voltage controlled capacitor, or other variable or adjustable capacitor. In an exemplary embodiment, the variable capacitor 720 can be used to adjust the amount of voltage provided to the rectifier circuit 704. In an exemplary embodiment, the variable capacitor 720 and the capacitor 702 operate as a capacitive voltage divider, functioning to control the voltage at the node 745.

In an exemplary embodiment, the variable capacitor 720 is configured to shunt tune the wireless power receiver 700, thus allowing some adjustment over the output voltage, Vout. In an exemplary embodiment, the variable capacitor 720 is also configured to contribute to the resonance of the receive resonator 718. In an exemplary embodiment, the variable capacitor 720 is configured as a capacitive voltage divider, thus being able to reduce the voltage provided to the rectifier circuit 704 responsive to a control signal provided by the feedback circuit 725. Adjusting the variable capacitor 720 affects the AC voltage, Vac, provided at the node 745. The voltage at the node 745 is the root mean square (RMS) AC voltage at the operating frequency, which can be 6.78 MHz in an exemplary embodiment. However, other operating frequencies are possible.

The rectifier circuit 704 comprises a diode 706, a diode 707, and a capacitor 708. The values and specifications of the diode 706, the diode 707, the capacitor 708, and whether the diodes 706 and 707 are replaced with switches, etc., are dependent on the application. As such a variety of rectifier topologies are contemplated. In an exemplary embodiment, the rectifier circuit 704 can be an embodiment of the AC-DC converter 520 shown in FIG. 5. A voltage regulation function is provided via control of the variable capacitors 710 and 720 and the feedback circuit 725, thus, in an aspect, reducing the need for any other dedicated DC-to-DC circuitry (e.g., such as a buck converter) that may be large, expensive, and/or inefficient. This ability to reduce the need for further large or expensive DC-to-DC conversion circuitry enables aspects of certain embodiments described herein to be particularly suitable for smaller devices or devices with irregular form factors (e.g., wearables or other small devices) that have integrated wireless power receiver circuitry where size and cost are important design considerations and where the ability to handle a wide range of induced voltage is desired.

The resistor 712 represents a load across the receive resonator 718 and the DC output voltage, Vout, appears at connection 716. In an exemplary embodiment, the load may comprise a rechargeable battery configured to power the device in which the wireless power receiver 700 is located. Alternatively, the load may comprise any device, application, or process configured to receive and/or operate using wirelessly received power.

In an exemplary embodiment, the feedback circuit 725 comprises an error amplifier 722, a first function element 726 and a second function element 728. In an exemplary embodiment, the error amplifier 722 can be implemented using an operation amplifier (Op Amp) or another circuit. The error amplifier 722 is configured to receive the output voltage Vout on connection 716 at a non-inverting input and is configured to receive a reference voltage, Vref, at an inverting input on connection 724. The reference voltage, Vref, may be a target output voltage desired on connection 716. In an exemplary embodiment, the target output voltage desired on connection 716 may be 4.2 volts. The output of the error amplifier 722 on connection 723 is an error signal representing the difference between Vout and Vref. Alternatively, the error amplifier 722 may be implemented using other configurations, such as a transconductance amplifier.

In an exemplary embodiment, the first function element 726 and the second function element 728 represent logic and circuitry that can transform the output of the error amplifier 722 on connection 723 to respective control signals appropriate for the variable capacitor 710 and the variable capacitor 720. In an exemplary embodiment, the first function element 726 and the second function element 728 may comprise one or more lookup tables that correspond to "functions" of the voltage on connection 723 and that determine the values of the variable capacitor 710 and the variable capacitor 720, respectively, based on the voltage on connection 723. In general, in response to an increasing voltage output, Vout, the feedback circuit 725 may increase the capacitance of the variable capacitor 720 (C2) to "divide" some of the voltage away from the rectifier circuit 704, thus reducing the voltage, Vout. At the same time, the capacitance of the variable capacitor 710 (C1) is decreased to "off-tune" the receive resonator 718 away from its resonant frequency, thus reducing energy in the receive resonator 718. The capacitance values for the variable capacitors 710 and 720 are chosen such that when the output of the rectifier circuit 704 is below the desired voltage, Vref, the variable capacitor 710 (C1) returns the receive resonator 718 to resonance and the variable capacitor 720 (C2) is open, thus increasing the voltage to the rectifier circuit 704, and accordingly increasing the output voltage, Vout. Similarly, in response to a decreasing voltage output, Vout, the variable capacitor 720 (C2) may be adjusted to increase the voltage output, Vout, and the variable capacitor 710 (C1) may be adjusted to increase the electrical current in the receive resonator 718.

Figure 8:
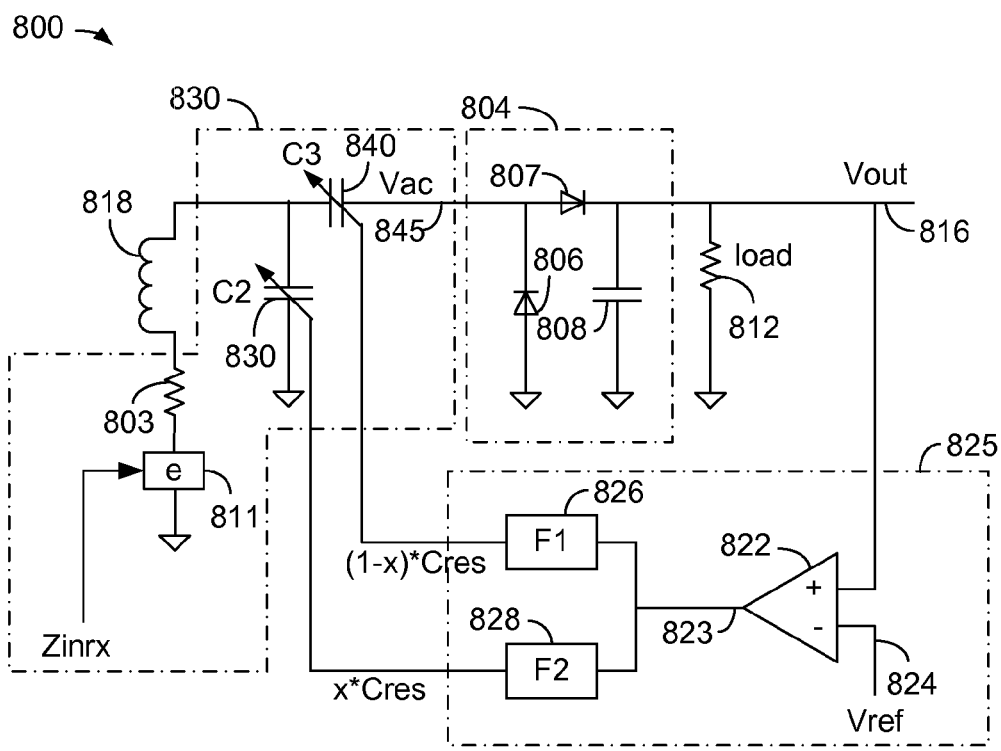
FIG. 8 is a block diagram showing an exemplary embodiment of a portion of a wireless power receiver including closed loop voltage control.

FIG. 8 is a block diagram showing an exemplary embodiment of a portion of a wireless power receiver 800 including closed loop voltage control. The wireless power receiver 800 comprises portions of the receiver 508 of FIG. 5 that are relevant to the description of the closed loop voltage control described herein.

In an exemplary embodiment, the wireless power receiver 800 comprises a receive resonator 818 coupled to a resonant tank circuit 830. In an exemplary embodiment, the resonant tank circuit 830 comprises fixed value and adjustable value components that can be configured to allow the resonator 818 to operate at a resonant frequency.

In an exemplary embodiment, the resonant tank circuit 830 is configured as a half bridge circuit that has a characteristic resistance and a characteristic impedance. In an exemplary embodiment, the resonant tank circuit 830 is coupled to a receive resonator 818, which is coupled to a resistance that is shown in FIG. 8 as a resistor 803, and which is coupled to an impedance that is shown in FIG. 8 as an impedance element 811. The resistor 803 represents the resistive loss of the receiver resonator 818 and the impedance element 811 represents the impedance Zinrx "looking into" the receive resonator 818.

In an exemplary embodiment, the resonant tank circuit 830 comprises a variable capacitor 830 coupled in parallel across the receive resonator 818 and a variable capacitor 840 coupled in series with the receive resonator 818. In an exemplary embodiment, the variable capacitor 830 and the variable capacitor 840 can each be a variable, or adjustable capacitor, such as a voltage controlled capacitor, or other variable or adjustable capacitor. In an exemplary embodiment, the variable capacitor 830 and the variable capacitor 840 are arranged in what is referred to as a "series-shunt" arrangement in that the variable capacitor 830 is coupled across the receive resonator 818 and the variable capacitor 840 is coupled in series with the receive resonator 818. In an exemplary embodiment, the variable capacitor 830 and the variable capacitor 840 can be used to tune the resonant frequency of the receive resonator 818 responsive to respective control signals provided by a feedback circuit 825, while the impedance Zinrx "looking into" the receive resonator 818 remains real. In an exemplary embodiment, the feedback circuit 825 is a closed loop feedback circuit. The tuning of the wireless power receiver 800 can be affected by the location of the wireless power receiver 800 on a wireless charging surface, such as a transmitter pad, by nearby metal, and by the presence of other receivers, devices, etc. Using the variable capacitors 830 and 840 to tune the resonant frequency of the receive resonator 818 can help increase magnetic coupling between a transmit resonator and the receive resonator 818 and thus increase total power available from a given wireless power system. Adjusting the variable capacitors 830 and 840 can also affect the AC voltage, Vac, provided at the node 845. The voltage at the node 845 is the root mean square (RMS) AC voltage at the operating frequency, which can be 6.78 MHz in an exemplary embodiment. However, other operating frequencies are possible.

In an exemplary embodiment, the wireless power receiver 800 also comprises a rectifier circuit 804, a resistor 812 representing a load, and a feedback circuit 825.

In an exemplary embodiment, the impedance of the variable capacitor 830 and the impedance of the variable capacitor 840 operate to control the output voltage at the node 845 in response to a signal from the feedback circuit 825.

The rectifier circuit 804 comprises a diode 806, a diode 807, and a capacitor 808. The values and specifications of the diode 806, the diode 807, the capacitor 808 and whether the diodes 806 and 807 are replaced with switches, etc., are dependent on the application. As such a variety of rectifier topologies are contemplated. In an exemplary embodiment, the rectifier circuit 804 can be an embodiment of the AC-to-DC converter 520 shown in FIG. 5. A voltage regulation function is provided via control of the variable capacitors 830 and 840 and the feedback circuit 825, thus, in an aspect, reducing the need for any other dedicated DC-to-DC circuitry (e.g., such as one that can boost the output voltage) that may be large, expensive, and/or inefficient. This ability to reduce the need for further large or expensive DC-to-DC conversion circuitry enables aspects of certain embodiments described herein to be particularly suitable for smaller devices or devices with irregular form factors (e.g., wearables or other small devices) that have integrated wireless power receiver circuitry where size and cost are important design considerations and where the ability to handle a wide range of induced voltage is desired.

The resistor 812 represents a load across the receive resonator 818 and the DC output voltage, Vout, appears at connection 816. In an exemplary embodiment, the load may comprise a rechargeable battery configured to power the device in which the wireless power receiver 800 is located. Alternatively, the load may comprise any device, application, or process configured to receive and/or operate using wirelessly received power.

In an exemplary embodiment, the feedback circuit 825 comprises an error amplifier 822, a first function element 826 and a second function element 828. In an exemplary embodiment, the error amplifier 822 can be implemented using an operation amplifier (Op Amp) or another circuit. The error amplifier 822 is configured to receive the output voltage Vout on connection 816 at a non-inverting input and is configured to receive a reference voltage, Vref, at an inverting input on connection 824. The output of the error amplifier 822 on connection 823 is an error signal representing the difference between Vout and Vref. The reference voltage, Vref, may be a target output voltage desired on connection 816. In an exemplary embodiment, the target output voltage desired on connection 816 may be 4.2 volts. Alternatively, the error amplifier 822 may be implemented using other configurations, such as a transconductance amplifier.

In an exemplary embodiment, the variable capacitor 830 and the variable capacitor 840 can be adjusted to maintain the receive resonator 818 at or near resonance, and to adjust the voltage provided to the rectifier circuit 804. The term "C" or "Cres" is the total capacitance value of the variable capacitors 830 and 840. The value Cres corresponds to the total capacitance value of the variable capacitor 830 and the variable capacitor 840 at which the receive resonator 818 is at or near resonance. The value of the variable capacitor 830 is x*Cres and the value of the variable capacitor 840 is (1−x)*Cres. The term "x" represents a number between 0 and 1 (1<x<0), such that the value of the variable capacitor 830 and the value of the variable capacitor 840 add together to achieve the value "C" or "Cres." Stated another way, the term "x" is the number between 0 and 1 that controls the value of the variable capacitor 830 and the variable capacitor 840 to maintain the receive resonator 818 at or near resonance as the load, represented by the load resistor 812, varies. The term "x" can be adjusted such that the impedance Zinrx "looking into" the receive resonator 818 is maintained as a real impedance while causing the output voltage, Vout, in connection 816 to remain constant. Therefore, any change in the capacitance of either the variable capacitor 830 or 840 is accompanied by a corresponding change in the other variable capacitor to maintain resonance (e.g., or at least real load values) while also providing the ability to adjust impedance at the load resistor 812 to control the output voltage on connection 816. In an exemplary embodiment, the portion of the total capacitance provided by the variable capacitor 830 is inversely proportional to the portion of the total capacitance provided by variable capacitor 840.

As one example, to determine the values to which to adjust the variable capacitor 830 and the variable capacitor 840:

Find Cres=$1/\omega^*L2$ (where $\omega$ is the resonant frequency and L2 is the inductance value of the receive resonator 818.

$$C_2 = x^*Cres$$

$$C_3 = (1-x)^*Cres$$

This maintains the impedance Zinrx real or near-real for all values of load (load resistor 812) and adjusting the value of "x" maintains the voltage at node 845 constant for all values of load (load resistor 812). Further, it is possible to determine a value of "x" that will result in a particular voltage at node 845.

As an example:

$$M_{12} = 300 \times 10^{-9}$$

$$r_3 = 10$$

$$L_2 = 750 \times 10^{-9}$$

$$|V_3(\omega_0, r_3, x)| = 10$$

$$x = 0.492$$

$$Z_{in1}(\omega_0, r_3, x) = 53.553 + 3.473i$$

$$P_{out3}(\omega_0, r_3, x) = 10$$

$$C_2(x) = 3.614 \times 10^{-10} |V_{c2}(\omega_0, r_3, x)| = 128.224$$

$$C_3(x) = 3.733 \times 10^{-10} |V_{c3}(\omega_0, r_3, x)| = 62.887$$

$$\text{efficiency}(\omega_0, r_3, x) = 0.829$$

Where $M_{12}$ is the mutual inductance between a transmit resonator and a receive resonator, r3 is the load resistance 812, $L_2$ is the receive resonator 818, $V_3$ is the output voltage, Vout, x is a number between 1 and 0, $Z_{in1}$ is the impedance Zinrx "looking into" the receive resonator 818, Pout3 is the power output across the load resistance 812, $C_2(x)$ is the value of the variable capacitor 830 and $C_3(x)$ is the value of the variable capacitor 840.

In an exemplary embodiment, the first function element 826 and the second function element 828 represent logic and circuitry that can transform the output of the error amplifier 822 on connection 823 to respective control signals appropriate for the variable capacitor 830 and the variable capacitor 840. In an exemplary embodiment, the first function element 826 and the second function element 828 may comprise logic or circuitry that correspond to "functions" of the voltage on connection 823 and that determine the values of the variable capacitor 830 and the variable capacitor 840, respectively, based on the voltage on connection 823. For example, if the voltage on connection 823 corresponds to the value of "x" mentioned above, then the capacitance of the variable capacitor 840 is equal to the resonant capacitance (Cres) multiplied by 1−x; and the value of the variable capacitor 830 is the resonant capacitance (Cres) multiplied by x, where x is between 0 and 1.

In general, an increasing voltage, Vout, will cause the capacitance of the variable capacitors 830 and 840 to be increased to "reduce" the voltage provided to the rectifier circuit 804, thus decreasing the voltage, Vout. Similarly, a decreasing voltage, Vout, will cause the capacitance of the variable capacitors 830 and 840 to be decreased to "increase" the voltage provided to the rectifier circuit 804, thus increasing the voltage, Vout. In the exemplary embodiment described above, the capacitance of the variable capacitors 830 and 840 is complementary, i.e., when one increases the other decreases. Therefore, for example, when the capacitance of the variable capacitor 830 increases, the capacitance of the variable capacitor 840 decreases and the voltage at the node 845 increases.

Figure 9:
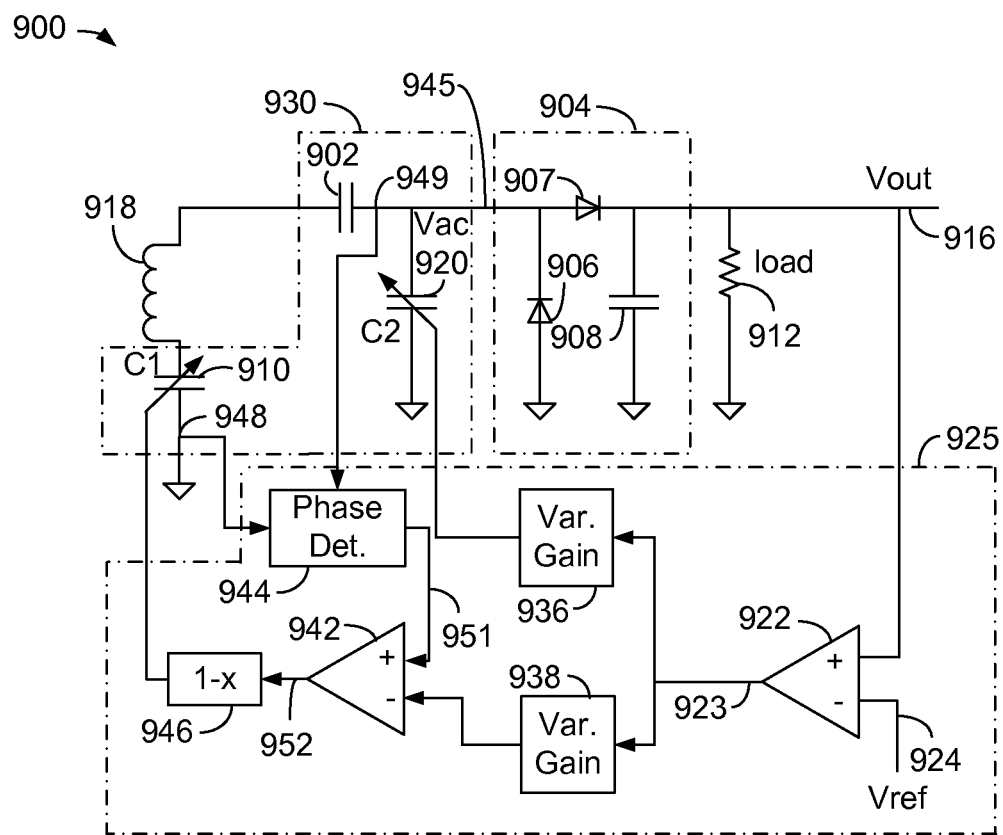
FIG. 9 is a block diagram showing an exemplary embodiment of a portion of a wireless power receiver including closed loop voltage control.

FIG. 9 is a block diagram showing an exemplary embodiment of a portion of a wireless power receiver 900 including closed loop voltage control. The wireless power receiver 900 comprises portions of the receiver 508 of FIG. 5 that are relevant to the description of the closed loop voltage control described herein.

In an exemplary embodiment, the wireless power receiver 900 comprises a receive resonator 918 coupled to a resonant tank circuit 930. In an exemplary embodiment, the resonant tank circuit 930 comprises fixed value and adjustable value components that can be configured to allow the resonator 918 to operate at a resonant frequency.

In an exemplary embodiment, the resonant tank circuit 930 is configured as a half bridge circuit in which the receive resonator 918 is coupled to a variable capacitor 910. In an exemplary embodiment, the capacitor 910 can be a variable, or adjustable capacitor, such as a voltage controlled capacitor, or other variable or adjustable capacitor. In an exemplary embodiment, the variable capacitor 910 can be used to tune the resonant frequency of the receive resonator 918 responsive to a control signal provided by a feedback circuit 925. In an exemplary embodiment, the feedback circuit 925 is a closed loop feedback circuit. The tuning of the wireless power receiver 900 can be affected by the location of the wireless power receiver 900 on a wireless charging surface, such as a transmitter pad, by nearby metal, and by the presence of other receivers, devices, etc. Using the variable capacitor 910 to tune the resonant frequency of the receive resonator 918 can help increase magnetic coupling between a transmit resonator and the receive resonator 918 and thus increase total power available from a given wireless power system.

In an exemplary embodiment, the wireless power receiver 900 also comprises a capacitor 902, a variable, or adjustable capacitor 920, a rectifier circuit 904, a resistor 912 representing a load, and the feedback circuit 925. The capacitor 902 contributes to the resonance of the receive resonator 918.

In an exemplary embodiment, the capacitor 920 can be a variable, or adjustable capacitor, such as a voltage controlled capacitor, or other variable or adjustable capacitor. In an exemplary embodiment, the variable capacitor 920 can be used to adjust the amount of voltage provided to the rectifier circuit 904. In an exemplary embodiment, the variable capacitor 920 and the capacitor 902 operate as a capacitive voltage divider, functioning to control the voltage at the node 945.

In an exemplary embodiment, the variable capacitor 920 is configured to shunt tune the wireless power receiver 900, thus allowing adjustment over the output voltage, Vout. In an exemplary embodiment, the variable capacitor 920 is also configured to contribute to the resonance of the receive resonator 918. In an exemplary embodiment, the variable capacitor 920 is configured as a capacitive voltage divider, thus being able to reduce the voltage provided to the rectifier 904 responsive to a control signal provided by the feedback circuit 925. Adjusting the variable capacitor 920 affects the AC voltage, Vac, provided at the node 945. The voltage at the node 945 is the root mean square (RMS) AC voltage at the operating frequency, which can be 6.78 MHz in an exemplary embodiment. However, other operating frequencies are possible.

The rectifier circuit 904 comprises a diode 906, a diode 907, and a capacitor 908. The values and specifications of the diode 906, the diode 907, the capacitor 908 and whether the diodes 906 and 907 are replaced with switches, etc., are dependent on the application. As such a variety of rectifier topologies are contemplated. In an exemplary embodiment, the rectifier circuit 904 can be an embodiment of the AC-to-DC converter 520 shown in FIG. 5. A voltage regulation function is provided via control of the variable capacitors 910 and 920 and the feedback circuit 925, thus, in an aspect, reducing the need for any other dedicated DC-to-DC circuitry (e.g., such as a buck converter) that may be large, expensive, and/or inefficient. This ability to reduce the need for further large or expensive DC-to-DC conversion circuitry enables aspects of certain embodiments described herein to be particularly suitable for smaller devices or devices with irregular form factors (e.g., wearables or other small devices) that have integrated wireless power receiver circuitry where size and cost are important design considerations and where the ability to handle a wide range of induced voltage is desired.

The resistor 912 represents a load across the receive resonator 918 and the output voltage, Vout, appears at connection 916. In an exemplary embodiment, the load may comprise a rechargeable battery configured to power the device in which the wireless power receiver 900 is located. Alternatively, the load may comprise any device, application, or process configured to receive and/or operate using wirelessly received power.

In an exemplary embodiment, the feedback circuit 925 comprises an error amplifier 922, a first variable gain element 936, a second variable gain element 938, a phase detector 944, a phase error amplifier 942, and an inverter 946.

In an exemplary embodiment, the error amplifier 922 can be implemented using an operation amplifier (Op Amp) or another circuit. The error amplifier 922 is configured to receive the output voltage Vout on connection 916 at a non-inverting input and is configured to receive a reference voltage, Vref, at an inverting input on connection 924. The output of the error amplifier 922 on connection 923 is an amplified error signal representing the difference between Vout and Vref. The reference voltage, Vref, may be a target output voltage desired on connection 916. In an exemplary embodiment, the target output voltage desired on connection 916 may be 4.2 volts. Alternatively, the error amplifier 922 may be implemented using other configurations, such as a transconductance amplifier.

In an exemplary embodiment, the first variable gain element 936 and the second variable gain element 938 represent logic and circuitry that can transform the output of the error amplifier 922 on connection 923 to respective control signals appropriate for the variable capacitor 920 and for the phase error amplifier 942. In an exemplary embodiment, the first variable gain element 936 and the second variable gain element 938 may comprise one or more lookup tables that correspond to "functions" of the voltage on connection 923 and that determine the value of the variable capacitor 920 and the value provided to the phase error amplifier 942, based on the voltage on connection 723.

The phase detector 944 calculates the phase of the signal in the receive resonator 918 by comparing the current and voltage at a node 948 between the variable capacitor 910 and ground with the current and voltage at a node 949 between the capacitor 902 and the rectifier circuit 904. The phase detector 944 outputs a voltage on connection 951 that is proportional to the phase difference (for example, the phase detector 944 is configured to provide zero volt output when the signals at nodes 948 and 949 are in phase.)

The output of the phase detector 944 on connection 951 is provided to the non-inverting input of the phase error amplifier 942, and the output of the variable gain element 938 is provided to the inverting input of the phase error amplifier 942. The output of the phase error amplifier 942 on connection 952 is a voltage signal that is proportional to the difference between the output of the phase detector 944 and the output of the variable gain element 938. The output of the phase error amplifier 942 is provided to the inverter 946, which inverts the voltage from the phase error amplifier 942 and provides the control signal to the variable capacitor 910.

At low voltages, for example, when the value of Vout is less than the value of the reference voltage, Vref, the error amplifier 922 outputs zero volts. Thus, the capacitance of the variable capacitor 920 (C2) is controlled to be close to zero, and substantially all of the voltage at node 949 is passed to the rectifier circuit 904. In this state, the wireless power receiver 900 is operating in-phase, with the phase detector 944 and phase error amplifier 942 causing the capacitance of the variable capacitor 910 (C1) to remain at a high value, thus maintaining the receive resonator 918 in resonance.

As the tuning of the receive resonator 918 changes (for example, due to placing the wireless power receiver 900 on a charging surface, such as a charging pad) the receive resonator 918 becomes off-tuned (i.e., is no longer tuned to the resonant frequency) and the phase detector 944 detects a phase difference between the nodes 948 and 949. The phase difference is provided as a voltage to the non-inverting input of the phase error amplifier 942, which compares this voltage to the output of the variable gain element 938. The phase error amplifier 942 provides a voltage to the inverter 946, which in turn generates the control signal that causes the capacitance of the variable capacitor 910 (C1) to change and return the receive resonator 918 to resonance.

As the value of Vout increases and exceeds the value of the reference voltage, Vref, an error signal is generated by the error amplifier 922. As the error signal on connection 923 increases, the variable gain element 936 causes the capacitance of the variable capacitor 920 (C2) to increase. This increase in capacitance of the variable capacitor 920 shunts some voltage away from the rectifier circuit 904. At the same time, the error signal on connection 923 causes the phase error amplifier 942 to track to an off-resonance condition. In other words, instead of the phase error amplifier 942 maintaining a zero phase difference, it now maintains a phase difference of a magnitude given by the magnitude of the error signal provided by the variable gain element 938. This causes a control signal to be provided by the inverter 946 that adjusts the capacitance of the variable capacitor 910 to detune the receive resonator 918 away from the resonant frequency, thus reducing the current through the receive resonator 918. This detuning of the receive resonator 918 is important, since as the voltage error increases, more and more current will be shunted by the variable capacitor 920 (C2), leading to high circulating current in the receive resonator 918 and thus very low efficiencies. By changing the tuning of the receive resonator 918 (and thus reducing magnetic coupling between the receive resonator 918 and a transmit resonator), the current in the receive resonator 918 is reduced as voltage increases, maintaining relatively high efficiencies. For example, it may be desirable to reduce power when the battery is fully charged and can no longer accept more power, or in other cases where reduced power is desirable. Further, the efficiency is affected by the resistance of the receive resonator 918, lower current generally leads to lower losses and higher efficiency.

In an exemplary embodiment, the variable gain element 936 and the variable gain element 938 are adjusted to provide a tradeoff between shunt voltage reduction at the input to the rectifier circuit 904 and detuning of the receive resonator 918. If too much circulating current in the receiver resonator 918 is observed at high voltages, then the ratio A/B will be decreased.

Figure 10:
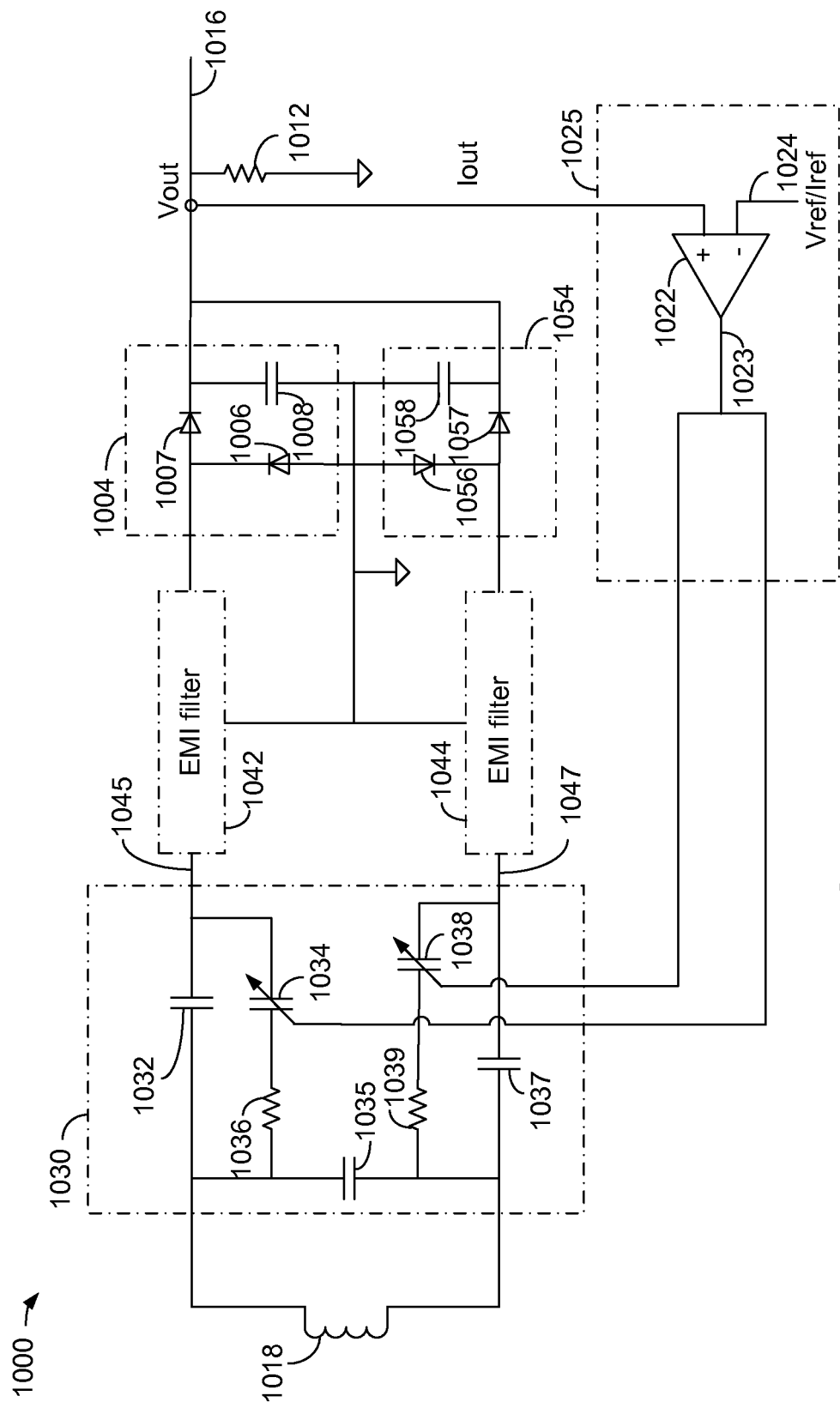
FIG. 10 is a block diagram showing an exemplary embodiment of a portion of a wireless power receiver including closed loop voltage control.

FIG. 10 is a block diagram showing an exemplary embodiment of a portion of a wireless power receiver 1000 including closed loop voltage control. The wireless power receiver 1000 comprises portions of the receiver 508 of FIG. 5 that are relevant to the description of the closed loop voltage control described herein.

In an exemplary embodiment, the wireless power receiver 1000 comprises a receive resonator 1018 coupled to a resonant tank circuit 1030. In an exemplary embodiment, the resonant tank circuit 1030 comprises fixed value and adjustable value components that can be configured to allow the resonator 1018 to operate at a resonant frequency. While the receive resonator 1018 is shown as being coupled to the resonant tank circuit 1030, the receive resonator 1018 can be considered to be part of the resonant tank circuit 1030 and therefore the resonant tank circuit 1030 comprises the inductance of the receive resonator 1018 and the capacitance shown in the elements comprising the resonant tank circuit 1030.

In an exemplary embodiment, the resonant tank circuit 1030 is configured as a full bridge circuit having a first bridge portion comprising a capacitor 1032, a first variable capacitor 1034 and a resistor 1036. The resonant tank circuit 1030 also has a second bridge portion comprising a capacitor 1037, a second variable capacitor 1038 and a resistor 1039. The resonant tank circuit 1030 also comprises a capacitor 1035 that is coupled as a shunt capacitor. In an exemplary embodiment, the capacitors 1032 and 1037 are fixed value capacitors that contribute to the resonance of the resonant tank circuit 1030.

In an exemplary embodiment, the first variable capacitor 1034 and the second variable capacitor 1038 are configured as series resonant capacitors and can have an adjustable value that is dependent on the desired resonant frequency of the receive resonator 1018. In an exemplary embodiment, the first variable capacitor 1034 and the second variable capacitor 1038 have an adjustable value that also controls the voltage output on node 1045 and node 1047. The resistors 1036 and 1039 represent series parasitic resistance of the first variable capacitor 1034 and the second variable capacitor 1038, respectively.

In an exemplary embodiment, the first variable capacitor 1034 and the second variable capacitor 1038 can be a variable, or adjustable capacitor, such as a voltage controlled variable capacitor, or other variable or adjustable capacitor or variable reactance or impedance element. In an exemplary embodiment, the first variable capacitor 1034 and the second variable capacitor 1038 can be used to tune the resonant frequency of the receive resonator 1018 and the voltage output on node 1045 and node 1047 responsive to a control signal provided by a feedback circuit 1025. The first variable capacitor 1034 and the second variable capacitor 1038 comprise a portion of the capacitance of the resonant tank circuit 1030. In an exemplary embodiment, varying the reactance or impedance of one or both of the first variable capacitor 1034 and the second variable capacitor 1038 varies the resonant frequency of the resonant tank circuit 1030, and therefore varies the voltages and currents in the resonant tank circuit 1030. For example, a particular voltage can be generated at the node 1045 and the node 1047 by varying the reactance or impedance of one or both of the first variable capacitor 1034 and the second variable capacitor 1038 at a particular frequency of interest, which can be 6.78 MHz in an exemplary embodiment. In an exemplary embodiment, the feedback circuit 1025 is a closed loop feedback circuit.

The tuning of the wireless power receiver 1000 can be affected by the location of the wireless power receiver 1000 on a wireless charging surface, such as a transmitter pad, by nearby metal, and by the presence of other receivers, devices, etc. Using the variable capacitor 1034 and the variable capacitor 1038 to tune the resonant frequency of the receive resonator 1018 can help increase magnetic coupling between a transmit resonator and the receive resonator 1018 and thus increase total power available from a given wireless power system.

In an exemplary embodiment, the wireless power receiver 1000 also comprises a first electromagnetic interference (EMI) filter 1042, a second EMI filter 1044, a first rectifier circuit 1004, a second rectifier circuit 1054, a resistor 1012 representing a load, and a feedback circuit 1025.

In an exemplary embodiment, the first variable capacitor 1034 and the second variable capacitor 1038 can be adjusted to both control the desired resonant frequency of the receive resonator 1018; and to control the voltage output on node 1045 and node 1047. Adjusting the first variable capacitor 1034 and the second variable capacitor 1038 enables continuous linear tuning of the resonant tank circuit 1030 to establish current regulation at the output 1016.

In an exemplary embodiment, the first variable capacitor 1034 and the second variable capacitor 1038 are configured to adjust the voltage and current provided to the rectifier circuit 1004 and the rectifier circuit 1054 responsive to a control signal provided by the feedback circuit 1025. Adjusting the first variable capacitor 1034 and the second variable capacitor 1038 affects the AC voltage, Vac, provided at the node 1045 and the node 1047. The voltage at the node 1045 and the node 1047 is the root mean square (RMS) AC voltage at the operating frequency, which can be 6.78 MHz in an exemplary embodiment. However, other operating frequencies are possible.

The rectifier circuit 1004 comprises a diode 1006, a diode 1007, and a capacitor 1008. The rectifier circuit 1054 comprises a diode 1056, a diode 1057, and a capacitor 1058. The values and specifications of the diode 1006, the diode 1007, the capacitor 1008, the diode 1056, the diode 1057 the capacitor 1058, and whether the diodes 1006, 1007, 1056 and 1057, are replaced with switches, etc., are dependent on the application. As such a variety of rectifier topologies are contemplated. In an exemplary embodiment, the rectifier circuit 1004 and the rectifier circuit 1054 can be an embodiment of the AC-to-DC converter 520 shown in FIG. 5. A voltage regulation function is provided via control of the variable capacitors 1034 and 1038 and the feedback circuit 1025, thus, in an aspect, reducing the need for any other dedicated DC-to-DC circuitry (e.g., such as a buck converter) that may be large, expensive, and/or inefficient. This ability to reduce the need for further large or expensive DC-to-DC conversion circuitry enables aspects of certain embodiments described herein to be particularly suitable for smaller devices or devices with irregular form factors (e.g., wearables or other small devices) that have integrated wireless power receiver circuitry where size and cost are important design considerations and where the ability to handle a wide range of induced voltage is desired.

The resistor 1012 represents a load across the receive resonator 1018 and the DC output voltage, Vout, appears at connection 1016. In an exemplary embodiment, the load may comprise a rechargeable battery configured to power the device in which the wireless power receiver 1000 is located. Alternatively, the load may comprise any device, application, or process configured to receive and/or operate using wirelessly received power.

In an exemplary embodiment, the feedback circuit 1025 comprises an error amplifier 1022, configured to provide an output on connection 1023. In an exemplary embodiment, the error amplifier 1022 can be implemented using an operational amplifier (Op Amp), an operational transconductance amplifier (OTA) or another circuit. In an exemplary embodiment, the error amplifier 1022 is configured to receive a voltage proportional to the output current, Iout, on connection 1016 at a non-inverting input and is configured to receive a reference voltage, Vref, that may be proportional to a current, Iref, at an approximate reference current of 400 mA, at an inverting input on connection 1024. The output of the error amplifier 1022 on connection 1023 is an error signal representing the difference between Iout and Iref. Alternatively, the error amplifier 1022 may be configured to compare the output voltage, Vout with a voltage reference Vref.

In an exemplary embodiment, the output of the error amplifier 1022 on connection 1023 is a control signal that is appropriate for the variable capacitor 1034 and the variable capacitor 1038. For example, if the error amplifier 1022 is comparing the output current, Iout, against a current reference, Iref, then the error amplifier 1022 changes the voltage at the first variable capacitor 1034 and the second variable capacitor 1038 to correct for the output current, Iout, so that if the output current, Iout, increases, the capacitance of the variable capacitors 1034 and 1038 changes to reduce the output current, Iout.

The exemplary embodiment of the wireless power receiver 1000 shown in FIG. 10 limits the total dissipated power to 600 mW in accordance with one exemplary implementation in all conditions and increases efficiency throughout the entire induced voltage and battery voltage range.

In an exemplary embodiment, the value of the variable capacitors 1034 and 1038 is relatively small, and may only vary from about 30 pF to about 180 pF to cover the full range of output power.

In an exemplary embodiment in which the variable capacitors 1034 and 1038 are implemented as voltage controlled variable capacitors, the maximum voltage rating for the variable capacitors 1034 and 1038 can be about 22V peak.

Figure 11:
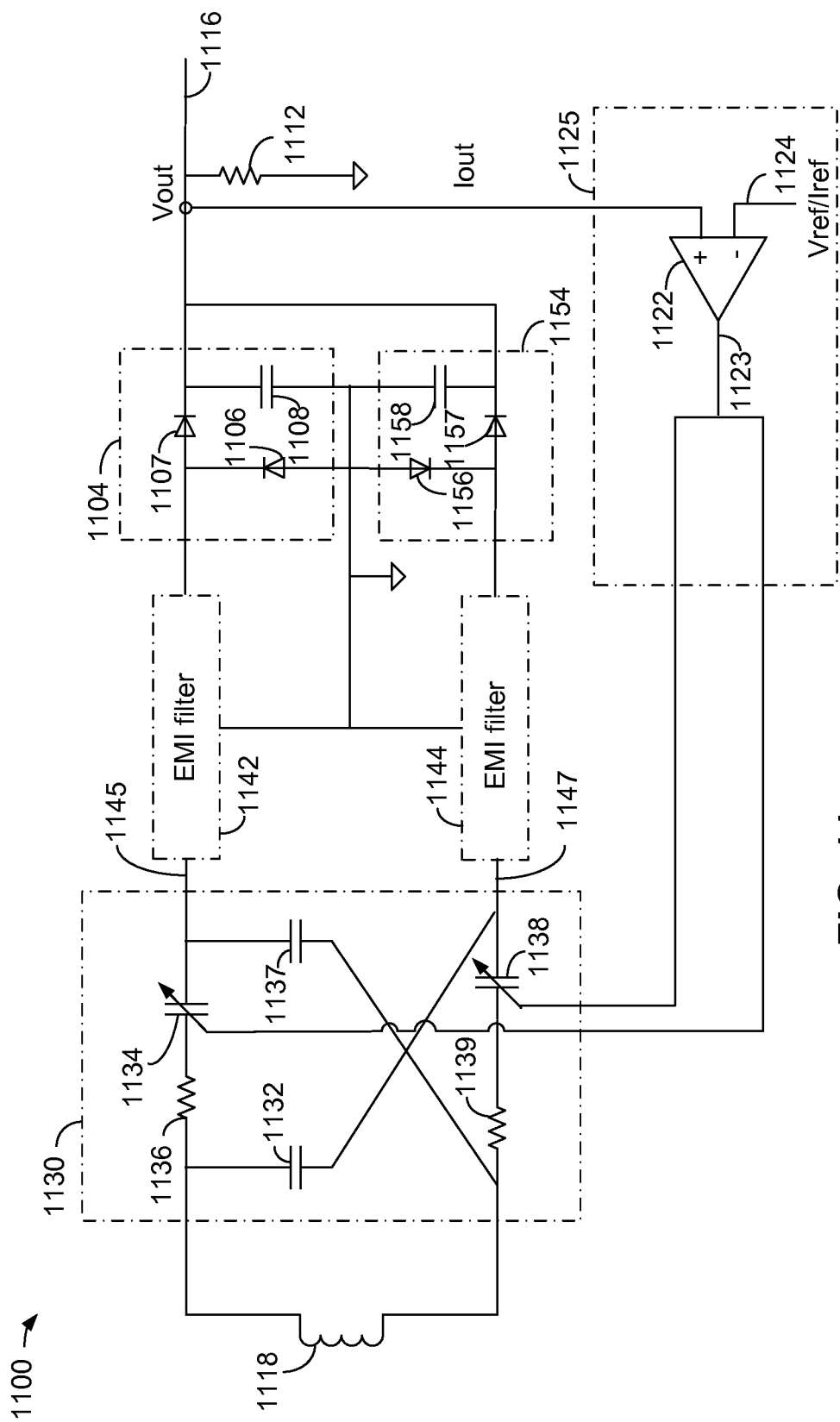
FIG. 11 is a block diagram showing an exemplary embodiment of a portion of a wireless power receiver including closed loop voltage control.

FIG. 11 is a block diagram showing an exemplary embodiment of a portion of a wireless power receiver 1100 including closed loop voltage control. The wireless power receiver 1100 comprises portions of the receiver 508 of FIG. 5 that are relevant to the description of the closed loop voltage control described herein.

In an exemplary embodiment, the wireless power receiver 1100 comprises a receive resonator 1118 coupled to a resonant tank circuit 1130. In an exemplary embodiment, the resonant tank circuit 1130 comprises fixed value and adjustable value components that can be configured to allow the resonator 1118 to operate at a resonant frequency. While the receive resonator 1118 is shown as being coupled to the resonant tank circuit 1130, the receive resonator 1118 can be considered to be part of the resonant tank circuit 1130 and therefore the resonant tank circuit 1130 comprises the inductance of the receive resonator 1118 and the capacitance shown in the elements comprising the resonant tank circuit 1130.

In an exemplary embodiment, the resonant tank circuit 1130 is configured as a full bridge circuit having a first bridge portion comprising a capacitor 1132, a first variable capacitor 1134 and a resistor 1136. The resonant tank circuit 1130 also has a second bridge portion comprising a capacitor 1137, a second variable capacitor 1138 and a resistor 1139. In an exemplary embodiment, the capacitors 1132 and 1137 are fixed value capacitors that contribute to the resonance of the resonant tank circuit 1130.

In an exemplary embodiment, the first variable capacitor 1134 and the second variable capacitor 1138 are configured as series resonant capacitors and can have an adjustable value that is dependent on the desired resonant frequency of the receive resonator 1118. In an exemplary embodiment, the first variable capacitor 1134 and the second variable capacitor 1138 have an adjustable value that also controls the voltage output on node 1145 and node 1147. The resistors 1136 and 1139 represent series parasitic resistance of the first variable capacitor 1134 and the second variable capacitor 1138, respectively.

In an exemplary embodiment, the capacitors 1132 and 1137 may have a fixed value and may be configured as shunt capacitors.

In an exemplary embodiment, the first variable capacitor 1134 and the second variable capacitor 1138 can be a variable, or adjustable capacitor, such as a voltage controlled variable capacitor, or other variable or adjustable capacitor or variable reactance or impedance element. In an exemplary embodiment, the first variable capacitor 1134 and the second variable capacitor 1138 can be used to tune the resonant frequency of the receive resonator 1118 and the voltage output on node 1145 and node 1147 responsive to a control signal provided by a feedback circuit 1125. The first variable capacitor 1134 and the second variable capacitor 1138 comprise a portion of the capacitance of the resonant tank circuit 1130. In an exemplary embodiment, varying the reactance or impedance of one or both of the first variable capacitor 1134 and the second variable capacitor 1138 varies the resonant frequency of the resonant tank circuit 1130, and therefore varies the voltages and currents in the resonant tank circuit 1130. For example, a particular voltage can be generated at the node 1145 and the node 1147 by varying the reactance or impedance of one or both of the first variable capacitor 1134 and the second variable capacitor 1138 at a particular frequency of interest, which can be 6.78 MHz in an exemplary embodiment. In an exemplary embodiment, the feedback circuit 1125 is a closed loop feedback circuit.

The tuning of the wireless power receiver 1100 can be affected by the location of the wireless power receiver 1100 on a wireless charging surface, such as a transmitter pad, by nearby metal, and by the presence of other receivers, devices, etc. Using the variable capacitor 1134 and the variable capacitor 1138 to tune the resonant frequency of the receive resonator 1118 can help increase magnetic coupling between a transmit resonator and the receive resonator 1118 and thus increase total power available from a given wireless power system.

In an exemplary embodiment, the wireless power receiver 1100 also comprises a first electromagnetic interference (EMI) filter 1142, a second EMI filter 1144, a first rectifier circuit 1104, a second rectifier circuit 1154, a resistor 1112 representing a load, and a feedback circuit 1125.

In an exemplary embodiment, the first variable capacitor 1134 and the second variable capacitor 1138 can be adjusted to both control the desired resonant frequency of the receive resonator 1118; and to control the voltage output on node 1145 and node 1147. Adjusting the first variable capacitor 1134 and the second variable capacitor 1138 enables continuous linear tuning of the resonant tank circuit 1130 to establish current regulation at the output 1116.

In an exemplary embodiment, the first variable capacitor 1134 and the second variable capacitor 1138 are configured so as to adjust the voltage and current provided to the rectifier circuit 1104 and the rectifier circuit 1154 responsive to a control signal provided by the feedback circuit 1125. Adjusting the first variable capacitor 1134 and the second variable capacitor 1138 affects the AC voltage, Vac, provided at the node 1145 and the node 1147. The voltage at the node 1145 and the node 1147 is the root mean square (RMS) AC voltage at the operating frequency, which can be 6.78 MHz in an exemplary embodiment. However, other operating frequencies are possible.

The rectifier circuit 1104 comprises a diode 1106, a diode 1107, and a capacitor 1108. The rectifier circuit 1154 comprises a diode 1156, a diode 1157, and a capacitor 1158. The values and specifications of the diode 1106, the diode 1107, the capacitor 1108, the diode 1156, the diode 1157 the capacitor 1158, and whether the diodes 1106, 1107, 1156 and 1157, are replaced with switches, etc., are dependent on the application. As such a variety of rectifier topologies are contemplated. In an exemplary embodiment, the rectifier circuit 1104 and the rectifier circuit 1154 can be an embodiment of the AC-to-DC converter 520 shown in FIG. 5. A voltage regulation function is provided via control of the variable capacitors 1134 and 1138 and the feedback circuit 1125, thus, in an aspect, reducing the need for any other dedicated DC-to-DC circuitry (e.g., such as a buck converter) that may be large, expensive, and/or inefficient. This ability to reduce the need for further large or expensive DC-to-DC conversion circuitry enables aspects of certain embodiments described herein to be particularly suitable for smaller devices or devices with irregular form factors (e.g., wearables or other small devices) that have integrated wireless power receiver circuitry where size and cost are important design considerations and where the ability to handle a wide range of induced voltage is desired.

The resistor 1112 represents a load across the receive resonator 1118 and the DC output voltage, Vout, appears at connection 1116. In an exemplary embodiment, the load may comprise a rechargeable battery configured to power the device in which the wireless power receiver 1100 is located. Alternatively, the load may comprise any device, application, or process configured to receive and/or operate using wirelessly received power.

In an exemplary embodiment, the feedback circuit 1125 comprises an error amplifier 1122, configured to provide an output on connection 1123. In an exemplary embodiment, the error amplifier 1122 can be implemented using an operational amplifier (Op Amp), an operational transconductance amplifier (OTA) or another circuit. In an exemplary embodiment, the error amplifier 1122 is configured to receive a voltage proportional to the output current, Iout, on connection 1116 at a non-inverting input and is configured to receive a reference voltage, Vref, that may be proportional to a current, Iref, at an approximate reference current of 400 mA, at an inverting input on connection 1124. The output of the error amplifier 1122 on connection 1123 is an error signal representing the difference between Iout and Iref. Alternatively, the error amplifier 1122 may be configured to compare the output voltage, Vout with a voltage reference Vref.

In an exemplary embodiment, the output of the error amplifier 1122 on connection 1123 is a control signal that is appropriate for the variable capacitor 1134 and the variable capacitor 1138. For example, if the error amplifier 1122 is comparing the output current, Iout, against a current reference, Iref, then the error amplifier 1122 changes the voltage at the first variable capacitor 1134 and the second variable capacitor 1138 to correct for the output current, Iout, so that if the output current, Iout, increases, the capacitance of the variable capacitors 1134 and 1138 changes to reduce the output current, Iout.

The exemplary embodiment of the wireless power receiver 1100 shown in FIG. 11 limits the total dissipated power to 600 mW in accordance with one exemplary implementation in all conditions and increases efficiency throughout the entire induced voltage and battery voltage range.

In an exemplary embodiment, the value of the variable capacitors 1132 and 1138 is relatively small, and may only vary from about 40 pF to about 280 pF to cover the full range of output power.

In an exemplary embodiment in which the variable capacitors 1132 and 1138 are implemented as voltage controlled variable capacitors, the maximum voltage rating for the variable capacitors 1132 and 1138 can be about 20V peak or lower.

Figure 12:
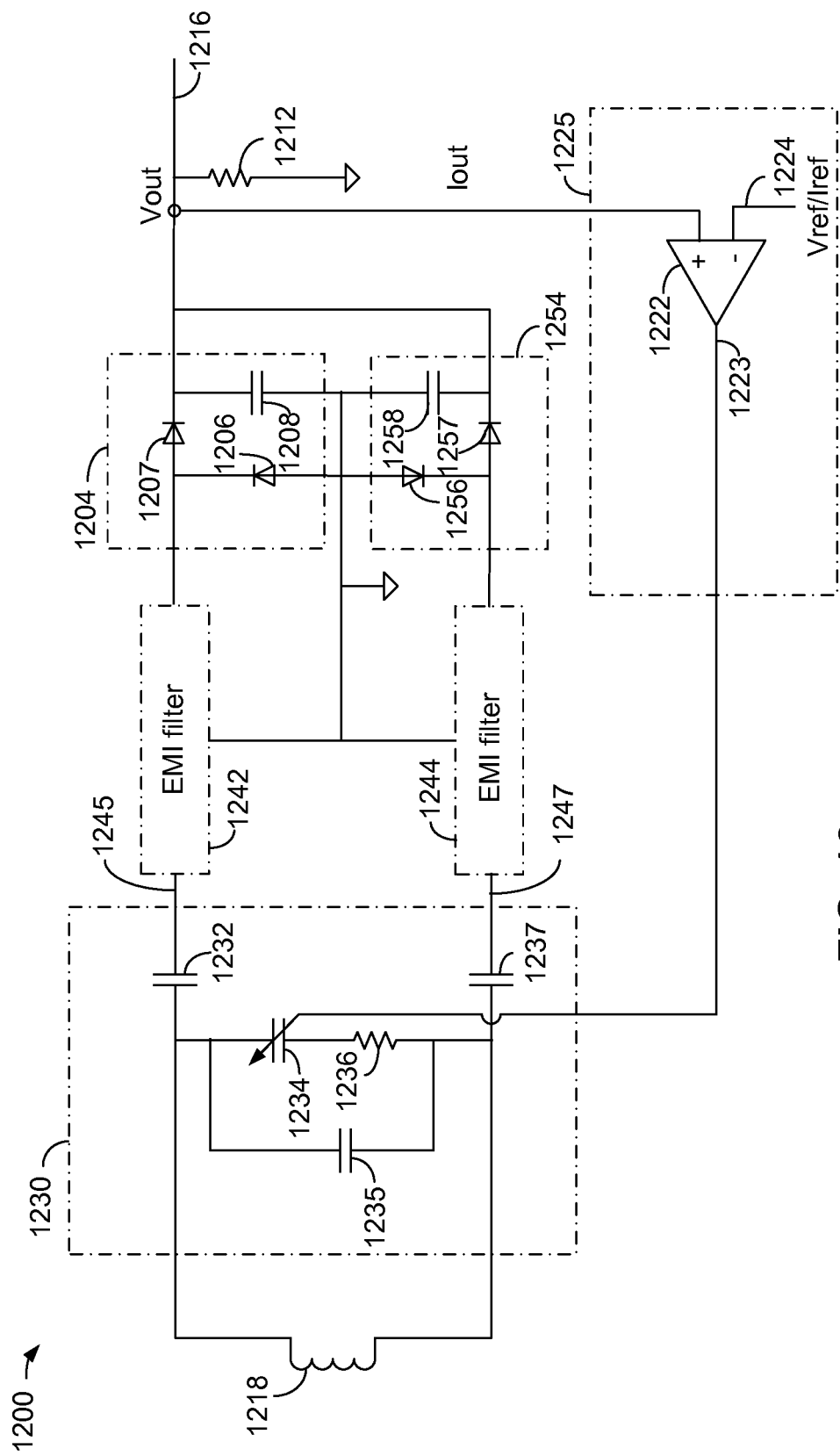
FIG. 12 is a block diagram showing an exemplary embodiment of a portion of a wireless power receiver including closed loop voltage control.

FIG. 12 is a block diagram showing an exemplary embodiment of a portion of a wireless power receiver 1200 including closed loop voltage control. The wireless power receiver 1200 comprises portions of the receiver 508 of FIG. 5 that are relevant to the description of the closed loop voltage control described herein.

In an exemplary embodiment, the wireless power receiver 1200 comprises a receive resonator 1218 coupled to a resonant tank circuit 1230. In an exemplary embodiment, the resonant tank circuit 1230 comprises fixed value and adjustable value components that can be configured to allow the resonator 1218 to operate at a resonant frequency. While the receive resonator 1218 is shown as being coupled to the resonant tank circuit 1230, the receive resonator 1218 can be considered to be part of the resonant tank circuit 1230 and therefore the resonant tank circuit 1230 comprises the inductance of the receive resonator 1218 and the capacitance shown in the elements comprising the resonant tank circuit 1230.

In an exemplary embodiment, the resonant tank circuit 1230 is configured as a full bridge circuit having a capacitor 1232, a capacitor 1235 a capacitor 1237, a variable capacitor 1234 and a resistor 1236.

In an exemplary embodiment, the capacitor 1232 and the capacitor 1237 have fixed values and are configured as series resonant capacitors, the values of the capacitor 1232 and the capacitor 1237 being dependent upon the desired resonant frequency of the receive resonator 1218. In an exemplary embodiment, the capacitor 1235 has a fixed value and is configured as a shunt capacitor. In an exemplary embodiment, the variable capacitor 1234 is configured as a shunt capacitor and can have an adjustable value that is dependent on the desired resonant frequency of the receive resonator 1218. In an exemplary embodiment, the variable capacitor 1234 has an adjustable value that also controls the voltage output on node 1245 and node 1247. The resistor 1236 represents series parasitic resistance of the variable capacitor 1234.

In an exemplary embodiment, the variable capacitor 1234 can be a variable, or adjustable capacitor, such as a voltage controlled variable capacitor, or other variable or adjustable capacitor or adjustable reactance or impedance element. In an exemplary embodiment, the variable capacitor 1234 can be used to tune the resonant frequency of the receive resonator 1218 and the voltage output on node 1245 and node 1247 responsive to a control signal provided by the feedback circuit 1225. The variable capacitor 1234 comprises a portion of the capacitance of the resonant tank circuit 1230. In an exemplary embodiment, varying the reactance or impedance of the variable capacitor 1234 varies the resonant frequency of the resonant tank circuit 1230, and therefore varies the voltages and currents in the resonant tank circuit 1230. For example, a particular voltage can be generated at the node 1245 and the node 1247 by varying the reactance or impedance of the variable capacitor 1234 at a particular frequency of interest, which can be 6.78 MHz in an exemplary embodiment. In an exemplary embodiment, the feedback circuit 1225 is a closed loop feedback circuit.

The tuning of the wireless power receiver 1200 can be affected by the location of the wireless power receiver 1200 on a wireless charging surface, such as a transmitter pad, by nearby metal, and by the presence of other receivers, devices, etc. Using the variable capacitor 1234 to tune the resonant frequency of the receive resonator 1218 can help increase magnetic coupling between a transmit resonator and the receive resonator 1218 and thus increase total power available from a given wireless power system.

In an exemplary embodiment, the wireless power receiver 1200 also comprises a first electromagnetic interference (EMI) filter 1242, a second EMI filter 1244, a first rectifier circuit 1204, a second rectifier circuit 1254, a resistor 1212 representing a load, and a feedback circuit 1225.

In an exemplary embodiment, the variable capacitor 1234 can be adjusted to both control the desired resonant frequency of the receive resonator 1218; and to control the voltage output on node 1245 and node 1247. Adjusting the variable capacitor 1234 enables continuous linear tuning of the resonant tank circuit 1230 to establish current regulation at the output 1216.

In an exemplary embodiment, the variable capacitor 1234 is configured so as to adjust the voltage and current provided to the rectifier circuit 1204 and the rectifier circuit 1254 responsive to a control signal provided by the feedback circuit 1225. Adjusting the variable capacitor 1234 affects the AC voltage, Vac, provided at the node 1245 and the node 1247. The voltage at the node 1245 and the node 1247 is the root mean square (RMS) AC voltage at the operating frequency, which can be 6.78 MHz in an exemplary embodiment. However, other operating frequencies are possible.

The rectifier circuit 1204 comprises a diode 1206, a diode 1207, and a capacitor 1208. The rectifier circuit 1254 comprises a diode 1256, a diode 1257, and a capacitor 1258. The values and specifications of the diode 1206, the diode 1207, the capacitor 1208, the diode 1256, the diode 1257 the capacitor 1258, and whether the diodes 1206, 1207, 1256 and 1257, are replaced with switches, etc., are dependent on the application. As such a variety of rectifier topologies are contemplated. In an exemplary embodiment, the rectifier circuit 1204 and the rectifier circuit 1254 can be an embodiment of the AC-to-DC converter 520 shown in FIG. 5. A voltage regulation function is provided via control of the variable capacitor 1234 and the feedback circuit 1225, thus, in an aspect, reducing the need for any other dedicated DC-to-DC circuitry (e.g., such as a buck converter) that may be large, expensive, and/or inefficient. This ability to reduce the need for further large or expensive DC-to-DC conversion circuitry enables aspects of certain embodiments described herein to be particularly suitable for smaller devices or devices with irregular form factors (e.g., wearables or other small devices) that have integrated wireless power receiver circuitry where size and cost are important design considerations and where the ability to handle a wide range of induced voltage is desired.

The resistor 1212 represents a load across the receive resonator 1218 and the DC output voltage, Vout, appears at connection 1216. In an exemplary embodiment, the load may comprise a rechargeable battery configured to power the device in which the wireless power receiver 1200 is located. Alternatively, the load may comprise any device, application, or process configured to receive and/or operate using wirelessly received power.

In an exemplary embodiment, the feedback circuit 1225 comprises an error amplifier 1222, configured to provide an output on connection 1223. In an exemplary embodiment, the error amplifier 1222 can be implemented using an operational amplifier (Op Amp), an operational transconductance amplifier (OTA) or another circuit. In an exemplary embodiment, the error amplifier 1222 is configured to receive a voltage proportional to the output current, Iout, on connection 1216 at a non-inverting input and is configured to receive a reference voltage, Vref, that may be proportional to a current, Iref, at an approximate reference current of 400 mA, at an inverting input on connection 1224. The output of the error amplifier 1222 on connection 1223 is an error signal representing the difference between Iout and Iref. Alternatively, the error amplifier 1222 may be configured to compare the output voltage, Vout with a voltage reference Vref.

In an exemplary embodiment, the output of the error amplifier 1222 on connection 1223 is a control signal that is appropriate for the variable capacitor 1234. For example, if the error amplifier 1222 is comparing the output current, Iout, against a current reference, Iref, then the error amplifier 1222 changes the voltage at the variable capacitor 1234 to correct for the output current, Iout, so that if the output current, Iout, increases, the capacitance of the variable capacitor 1234 changes to reduce the output current, Iout.

The exemplary embodiment of the wireless power receiver 1200 shown in FIG. 12 limits the total dissipated power to 400 mW in accordance with one exemplary implementation in all conditions and increases efficiency throughout the entire induced voltage and battery voltage range.

In an exemplary embodiment, the value of the variable capacitor 1234 is relatively small, and may only vary from about 25 pF to about 150 pF to cover the full range of output power. The physical size of a capacitor is related to its value. By appropriately selecting the value of the capacitor 1232 and the value of the capacitor 1237 it is possible to select the variable capacitor 1234 such that its maximum value is relatively small, and therefore the physical size of the variable capacitor 1234 may be minimized.

In an exemplary embodiment in which the variable capacitor 1234 is implemented as a voltage controlled variable capacitor, the maximum voltage rating for the variable capacitors 1234 can be about 35V peak.

At minimum induced voltage and high battery voltage the regulated current does not reach the desired 400 mA, however the current reaches 400 mA at low battery voltage (3V) and is reduced at higher battery voltage.

Figure 13:
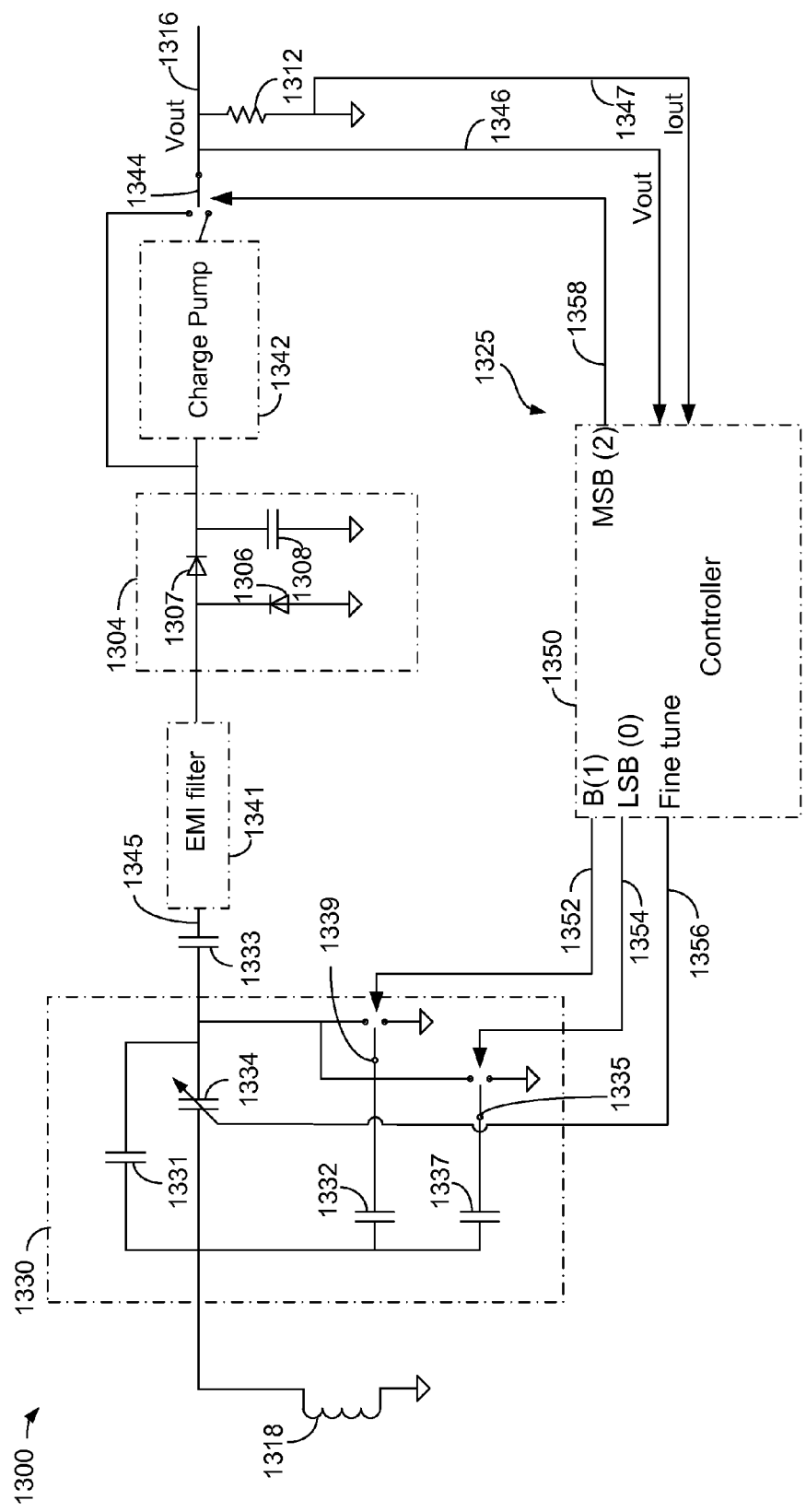
FIG. 13 is a block diagram showing an exemplary embodiment of a portion of a wireless power receiver including closed loop voltage control.

FIG. 13 is a block diagram showing an exemplary embodiment of a portion of a wireless power receiver 1300 including closed loop voltage control. The wireless power receiver 1300 comprises portions of the receiver 508 of FIG. 5 that are relevant to the description of the closed loop voltage control described herein. In an exemplary embodiment, it may be desirable for a wireless power receiver to have different stages of impedance adjustment based on operating conditions and tradeoffs between impedance adjustment ranges and power transfer efficiency to adjust the amount of received power.

In an exemplary embodiment, the wireless power receiver 1300 comprises a receive resonator 1318 coupled to a resonant tank circuit 1330. In an exemplary embodiment, the resonant tank circuit 1330 comprises fixed value and adjustable value components that can be configured to allow the resonator 1318 to operate at a resonant frequency. While the receive resonator 1318 is shown as being coupled to the resonant tank circuit 1330, the receive resonator 1318 can be considered to be part of the resonant tank circuit 1330 and therefore the resonant tank circuit 1330 comprises the inductance of the receive resonator 1318 and the capacitance shown in the elements comprising the resonant tank circuit 1330.

In an exemplary embodiment, the resonant tank circuit 1330 is configured as a half bridge circuit comprising a capacitor 1331, a capacitor 1332, a capacitor 1337, a variable capacitor 1334, a switch 1335 and a switch 1339. The output of the resonant tank circuit 1330 is provided to a capacitor 1333. The capacitor 1333 contributes to the resonance of the resonant tank circuit 1330 and also provides DC blocking.

In an exemplary embodiment, the variable capacitor 1334 is configured as a series resonant capacitor and can have an adjustable value that is dependent on the desired resonant frequency of the receive resonator 1318. In an exemplary embodiment, the variable capacitor 1334 has an adjustable value that also at least partially controls the voltage output on node 1345.

In an exemplary embodiment, the variable capacitor 1334 can be a variable, or adjustable capacitor, such as a voltage controlled variable capacitor, or other variable or adjustable capacitor, or adjustable reactance or impedance element. In an exemplary embodiment, the variable capacitor 1334 can be used to at least partially tune the resonant frequency of the receive resonator 1318 and the voltage output on node 1345 responsive to a control signal provided by a feedback circuit 1325. In an exemplary embodiment, the feedback circuit 1325 is a closed loop feedback circuit.

The capacitor 1331 is coupled as a series resonant capacitor and the capacitor 1333 is coupled as a series resonant capacitor. The capacitor 1332 is switched into and out of the resonant tank circuit 1330 by the switch 1339 and the capacitor 1337 is switched into and out of the resonant tank circuit 1330 by the switch 1335. In an exemplary embodiment, each of the capacitor 1332 and the capacitor 1337 may be a switchable fixed capacitor. The switches 1335 and 1339 are responsive to a control signal from the feedback circuit 1325.

In an exemplary embodiment, the capacitors 1331, 1333, 1332 and 1337 may have fixed values that are determined by the desired resonant frequency of the receive resonator 1318, and the desired off-resonance performance. For example, the capacitors 1332 and 1337 may have different values, based on the desired resonant and off-resonant performance.

The tuning of the wireless power receiver 1300 can be affected by the location of the wireless power receiver 1300 on a wireless charging surface, such as a transmitter pad, by nearby metal, and by the presence of other receivers, devices, etc. Using the variable capacitor 1334, and the capacitors 1332 and 1337 to tune the resonant frequency of the receive resonator 1318 can help increase magnetic coupling between a transmit resonator and the receive resonator 1318 and thus increase total power available from a wireless power transmitter (not shown). The variable capacitor 1334 comprises a portion of the capacitance of the resonant tank circuit 1330. In an exemplary embodiment, varying the reactance or impedance of the variable capacitor 1334 and controlling the switches 1335 and 1339 to switch the capacitors 1337 and 1332, respectively, into and out of the resonant tank circuit 1330 varies the resonant frequency of the resonant tank circuit 1330, and therefore varies the voltages and currents in the resonant tank circuit 1330. For example, a particular voltage can be generated at the node 1345 by varying the reactance or impedance of the variable capacitor 1334 at a particular frequency of interest, which can be 6.78 MHz in an exemplary embodiment.

In an exemplary embodiment, the wireless power receiver 1300 also comprises an electromagnetic interference (EMI) filter 1341, a rectifier circuit 1304, an impedance transformation element implemented in an exemplary embodiment as a charge pump 1342, a switch 1344, a resistor 1312 representing a load, and a feedback circuit 1325.

In an exemplary embodiment, the variable capacitor 1334, the capacitors 1332 and 1337, and the charge pump 1342 can be adjusted to both control the desired resonant frequency of the receive resonator 1318; and to control the voltage output on node 1345 and at the output 1316. Adjusting the variable capacitor 1334, the capacitors 1332 and 1337, and the charge pump 1342 enables continuous linear tuning of the resonant tank circuit 1330 to establish voltage and current regulation at the output 1316.

In an exemplary embodiment, the variable capacitor 1034, the capacitors 1332 and 1337, and the charge pump 1342 are configured to adjust the voltage provided at the output 1316 responsive to control signals provided by the feedback circuit 1325.

In an exemplary embodiment, the feedback circuit 1325 comprises a controller 1350 that may comprise control circuitry that can be configured to receive the voltage output, Vout, signal over connection 1346 and the current output, Iout, signal over connection 1347. The controller 1350 can be configured to develop a multiple bit control signal that may provide a control signal to the switch 1335 over connection 1354, a control signal to the switch 1339 over connection 1352, a control signal to the switch 1344 over connection 1358, and may develop an additional control signal that may control the variable capacitor 1334 over connection 1356.

In an exemplary embodiment, the charge pump 1342 may be configured to provide a coarse adjustment to the output voltage, Vout, on connection 1316, whereby the operation of the switch 1344 determines whether the charge pump is bypassed, or whether the output on connection 1316 is influenced by the charge pump 1342. In an exemplary embodiment, the charge pump 1342 may provide a divide-by-two (/2) function when it is coupled to the output on connection 1316, or it may be bypassed (e.g., there is no adjustment of the output voltage as it may be in a range acceptable to be provided to the output on connection 1316), such that it provides a coarse adjustment of the impedance of the receive resonator 1318. Adjusting the impedance of the receive resonator 1318 is another way of adjusting the voltage output of the wireless power receiver 1300 in that when converting an AC signal to a DC signal, the current=voltage/impedance. In an exemplary embodiment, adjusting the impedance of the receive resonator 1318 effectively changes the resistance of the receive resonator 1318. Therefore, power may remain the same but the relationship between voltage and current will change. In some cases this may also change the power output of the wireless power receiver 1300.

The variable capacitor 1334 receives a control signal from the controller 1350 over connection 1356 that provides a "fine tune" function to fine tune the resonant frequency of the resonant tank circuit 1330, thereby controlling the impedance of the receive resonator 1318, the voltage (and power) on the connection 1345 and at the output on connection 1316.

Combining the effect of controlling different components for regulating the output power at connection 1316 can result in an optimal impedance control system in terms of cost, size and efficiency. Different tuning methodologies can control the impedance of the receive resonator 1318 to different extents, and thereby control the power output on connection 1316. For example, determining whether the charge pump 1344 contributes to the signal at the output 1316 may provide gross, or coarse control of the impedance at the receive resonator 1318, and therefore the voltage and current at the connection 1316. In another example, controlling the capacitance of the variable capacitor 1334 may provide fine control of the resonant tank circuit 1330, and therefore, provide fine control over the impedance at the receive resonator 1318, and therefore the voltage at connection 1345.

In an exemplary embodiment, the capacitors 1332 and 1337 may provide additional intermediate adjustment of the impedance at the receive resonator 1318, and therefore, the voltage at the connection 1345, at a level and to an extent between the coarse impedance adjustment provided by the charge pump 1344 and the fine impedance adjustment provided by the variable capacitor 1334. For example, the values of the capacitors 1332 and 1337 can be chosen such that one capacitor may have twice as much influence over the impedance of the receive resonator 1318 as the other. For example, the value of the capacitor 1332 may be twice the value of the capacitor 1337 such that when the capacitor 1337 is switched by the switch 1335 so that it influences the resonant frequency of the receive resonator 1318, it has approximately one-half the amount of influence of when the capacitor 1332 is switched by the switch 1339 so that it influences the resonant frequency of the receive resonator 1318, and the capacitor 1337 is switched by the switch 1335 so that it does not influence the resonant frequency of the receive resonator 1318. In an alternative embodiment, the influence that the capacitors 1332 and 1337 have on the resonant frequency of the receive resonator 1318 can be combined when the switch 1335 and the switch 1339 are controlled so that both the capacitor 1337 and the capacitor 1332 influence the resonant frequency of the receive resonator 1318. Controlling the resonant frequency of the receive resonator 1318 determines the voltage at connection 1345, and therefore, determines the voltage and current at the output on connection 1316.

In an exemplary embodiment, the capacitor 1337 may have a value that is smaller or larger than the value of the capacitor 1332. In an exemplary embodiment, the control signals on connections 1354, 1352 and 1358 provided to the switches 1335, 1339 and 1344, respectively, may together comprise or the control of the switches 1335, 1339 and 1344 may correspond or map to or as a three bit control word, where the least significant bit (LSB) (0) may be used to control the switch 1335, and therefore determine whether the value of the capacitor 1337 is part of the resonant tank circuit 1330, the middle bit (1) may be used to control the switch 1339, and therefore determine whether the value of the capacitor 1332 is part of the resonant tank circuit 1330, and the most significant bit (MSB) (2) may be used to control the switch 1344, and therefore determine whether the charge pump 1342 contributes to the impedance of the receive resonator 1318. The impedance looking into the rectifier 1304 can be increased by using the charge pump 1342 to divide the input voltage at the output of the rectifier 1304, or can be decreased by bypassing the charge pump 1342. In an exemplary embodiment, using a three bit control methodology together with the different capacitance values of the capacitors 1332 and 1337, and the coarse adjustment of the charge pump 1342, provides eight (8) levels of control over the capacitance of the resonant tank circuit 1330 and over the voltage and current output on connection 1316.

In an exemplary embodiment, the controller 1350 generates the control signals on connections 1354, 1352, 1358 and 1356 such that the power control, and impedance control over the receive resonator 1318, is gradual, and can be ranked within the system from those that have the largest impact, to those that have the smallest impact. In an exemplary embodiment, the charge pump 1342 may have the largest impact because its control is binary, where the charge pump 1342 is either in one mode or another, such as the control provided to the switch 1344 to control whether the charge pump 1342 is bypassed. Such an impedance control methodology tends to keep the ratio of real impedance to complex impedance substantially real, which provides efficient power transfer. Methods of power control and impedance control of the receive resonator 1318 that provide finer increments of adjustment, such as controlling the switches 1335 and 1339 to control the capacitance provided by the capacitors 1337 and 1332, respectively, and controlling the capacitance of the variable capacitor 1334, can be used to detune the receive resonator 1318 away from resonance, thereby increasing the imaginary part of the impedance at the receive resonator 1318 to reduce the amount of power transfer to the wireless power receiver 1300.

In an exemplary embodiment, the charge pump 1342 may provide a ratio of 2:1 or 1:1 to change the input impedance by a factor of 4, or 6 dB in an exemplary embodiment. For example, the impedance transformation provided by the charge pump 1342 can be proportional to the square of the voltage transformation. In an exemplary embodiment, it may be desirable that a next finer stage of power control may change the input impedance of the receive resonator 1318 by a factor of 3 db. For example, this can be accomplished by carefully choosing the value of the capacitor 1332 such that controlling the switch 1339 to place the capacitor 1332 into the resonant tank circuit 1330 changes the input impedance of the receive resonator 1318 by approximately 3 db. Similarly, carefully choosing the value of the capacitor 1337 such that controlling the switch 1335 to place the capacitor 1337 into the resonant tank circuit 1330 changes the input impedance of the receive resonator 1318 by approximately 1.5 dB. Similarly, controlling the switch 1339 to place the capacitor 1332 into the resonant tank circuit 1330 and controlling the switch 1335 to place the capacitor 1337 into the resonant tank circuit 1330 may change the input impedance of the receive resonator 1318 by approximately 4.5 dB. Having several switchable shunt series capacitors, such as the capacitors 1332 and 1337, can improve the resolution of impedance control so that the fine tuning that is done by the variable capacitor 1334 may be minimized. Using the variable capacitor 1334 The fine control over input impedance of the receive resonator 1318 provided by the variable capacitor 1332 can be varied from a minimum value to detune the wireless power receiver 1300, to a maximum value to bring the wireless power receiver 1300 into resonance.

Although not shown in FIG. 13, the rectifier circuit 1304 may be implemented as a switchable rectifier, and can be used in place of or in addition to the charge pump 1342 to provide the above-mentioned 4:1 impedance transformation (2:1 voltage transformation). In another alternative embodiment, using a combination of a switchable rectifier and the charge pump 1342 would provide a 16:1 real impedance transformation, which would be a 4:1 voltage transformation. Such a configuration would provide a wider range of operation in receivers having a wide range of coupling parameters.

Although shown as providing a ratio of 2:1, the ratio of the charge pump 1342 could be any arbitrary integer ratio. However, a charge pump that has a small-integer ratio tends to be much smaller, more efficient and less costly. Integer ratios of 3:1, 3:2, and 3:3 (bypass) would be possible to use, giving impedance transformations of 9:1, 2.75:1 and 1:1, respectively. Having a charge pump 1342 with such a wide ratio could reduce the need for other switchable tuning elements in the wireless power receiver 1300.

Adjusting the variable capacitor 1334 and the capacitors 1332 and 1337 affects the AC voltage, Vac, provided at the node 1345. Further, adjusting the charge pump 1342 affects the AC voltage, Vac, provided at the output 1316. The voltage at the node 1345 is the root mean square (RMS) AC voltage at the operating frequency, which can be 6.78 MHz in an exemplary embodiment. However, other operating frequencies are possible.

The rectifier circuit 1304 comprises a diode 1306, a diode 1307, and a capacitor 1308. The values and specifications of the diode 1306, the diode 1307, the capacitor 1308, and whether the diodes 1306 and 1307, are replaced with switches, etc., are dependent on the application. As such a variety of rectifier topologies are contemplated. In an exemplary embodiment, the rectifier circuit 1304 can be an embodiment of the AC-to-DC converter 520 shown in FIG. 5. A voltage regulation function is provided via control of the variable capacitor 1334, the capacitors 1332 and 1337, the charge pump 1342 and the feedback circuit 1325, thus, in an aspect, reducing the need for any other dedicated DC-to-DC circuitry (e.g., such as a buck converter) that may be large, expensive, and/or inefficient. This ability to reduce the need for further large or expensive DC-to-DC conversion circuitry enables aspects of certain embodiments described herein to be particularly suitable for smaller devices or devices with irregular form factors (e.g., wearables or other small devices) that have integrated wireless power receiver circuitry where size and cost are important design considerations and where the ability to handle a wide range of induced voltage is desired.

The resistor 1312 represents a load across the receive resonator 1318 and the DC output voltage, Vout, appears at connection 1316. In an exemplary embodiment, the load may comprise a rechargeable battery configured to power the device in which the wireless power receiver 1300 is located. Alternatively, the load may comprise any device, application, or process configured to receive and/or operate using wirelessly received power.

Figure 14:
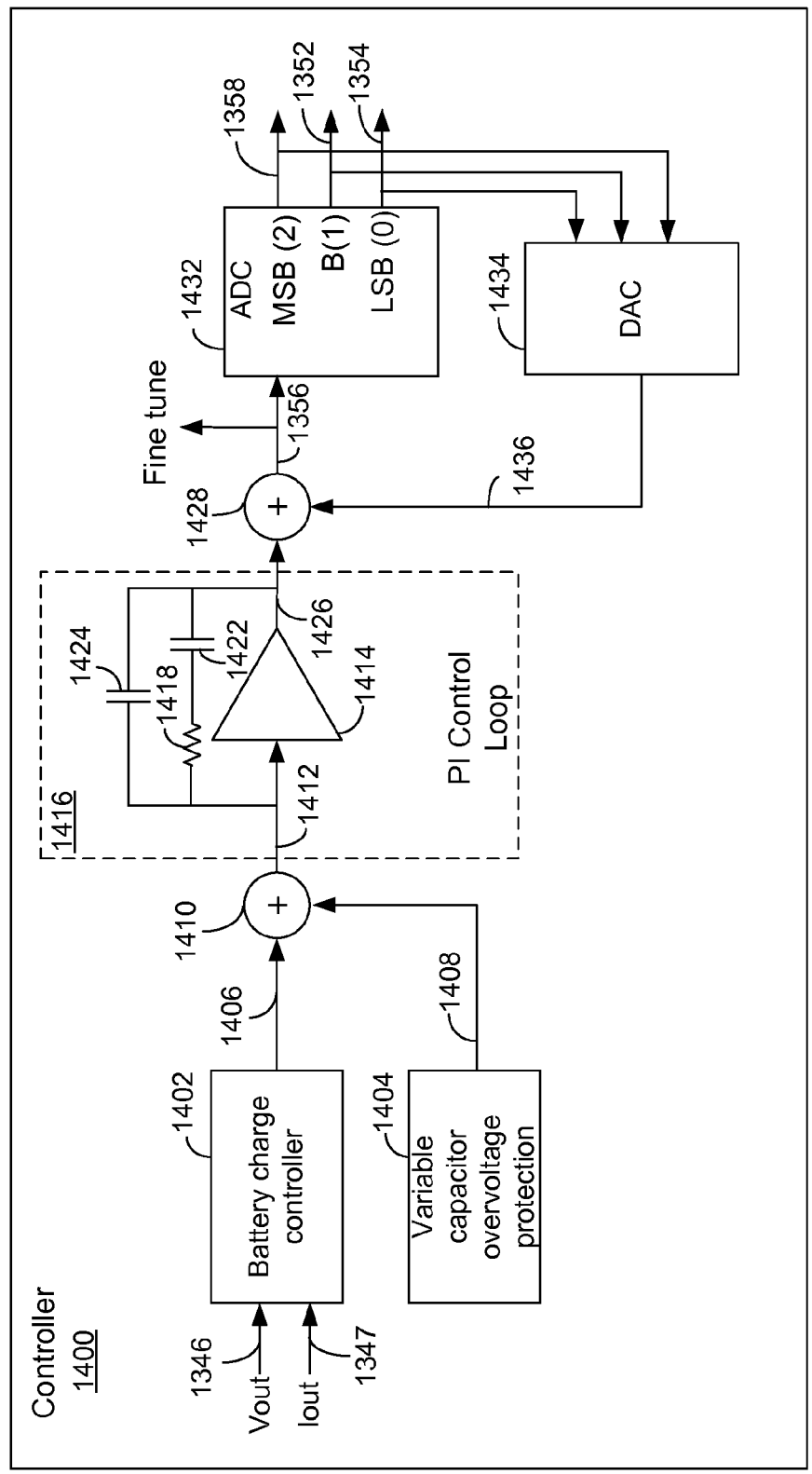
FIG. 14 is a functional block diagram showing an embodiment of the controller of FIG. 13.

FIG. 14 is a functional block diagram showing an embodiment of the controller of FIG. 13. In an exemplary embodiment, the controller 1400 is one possible implementation of the controller 1350 of FIG. 13. In an exemplary embodiment, the controller 1400 comprises a battery charge controller 1402, a variable capacitor overvoltage protection element 1404, an adder 1410, a proportional plus integral (PI) control loop 1416, an adder 1428, an analog-to-digital converter (ADC) 1432 and a digital-to-analog converted (DAC) 1434.

The PI control loop 1416 comprises an operational amplifier (op-amp) 1414 and a feedback network comprising a resistor 1418, a capacitor 1422 and a capacitor 1424. In an exemplary embodiment, the PI control loop 1416 determines the manner in which the impedance of the receive resonator 1318 (FIG. 13) should be adjusted to obtain the desired output.

The battery charge controller 1402 receives the voltage output, Vout, signal over connection 1346 (FIG. 13) and the current output, Iout, signal over connection 1347 (FIG. 13). The output of the battery charge controller 1402 is provided over connection 1406 to the adder 1410. The signal on connection 1406 is configured to maintain the battery at a desired charge level and can be configured to drive the output of the op-amp higher or lower, depending on the level of the voltage output, Vout, signal on connection 1346 and the current output, Iout, signal on connection 1347.

The variable capacitor overvoltage protection element 1404 measures the voltage across the variable capacitor 1334 and generates a control signal on connection 1408 that is summed into the PI control loop 1416 by the adder 1410. In response to the signal on connection 1408, the PI control loop 1416 can adjust the output power of the wireless power receiver 1300 (FIG. 13) to reduce the voltage across the variable capacitor 1334 if an overvoltage condition is determined by the variable capacitor overvoltage protection element 1404.

The adder combines the output of the battery charge controller 1402 and the variable capacitor overvoltage protection element 1404 and provides an input to the op-amp 1414 on connection 1412.

The op-amp 1414 provides a control signal on connection 1426 to the adder 1428. The output of the adder 1428 is provided over connection 1356 (FIG. 13) to the ADC 1432. The output of the adder 1428 is also provided over connection 1356 to provide a fine tuning control function to control the value of the variable capacitor 1334 (FIG. 13).

The output of the adder 1428 on connection 1356 is provided to the ADC 1432, which, in this exemplary embodiment, is a three (3) bit ADC configured to generate a three bit word to control the operation of the switches 1335, 1339 and 1344, over connections 1354, 1352 and 1358, respectively, of FIG. 13.

The output of the ADC 1432 is also provided to the DAC 1434, which generates an analog signal on connection 1436, which is provided to the adder 1428.

When the output of the adder 1428 on connection 1356 reaches its tuning limit, the ADC 1432 increments or decrements the control word comprising the values on connections 1354, 1352, and 1358 to provide an impedance adjustment by controlling the switches 1335, 1339 and 1344, respectively, so that the fine tuning adjustment signal on connection 1356 should no longer be at its limit and therefore, can provide further fine tuning control over the variable capacitor 1334 (FIG. 13).

Figure 15:
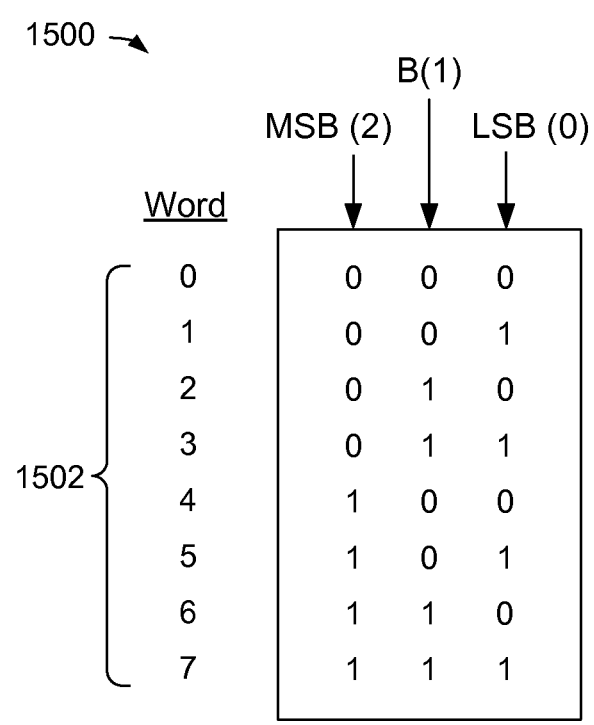
FIG. 15 is a block diagram showing an example of the control logic generated by the controller of FIG. 13.

FIG. 15 is a block diagram showing an example of the control logic generated by the controller of FIG. 13. The logic table 1500 shows the eight (8) states of a three bit control word 1502 that can be used to control the states of the switches 1335, 1339 and 1344, over connections 1354, 1352 and 1358, respectively, of FIG. 13. The controller 1350 may generate the three bits, LSB (0), B(1), and MSB (2), on respective connections 1354, 1352 and 1358 (FIG. 13) such that the switches 1335, 1339 and 1344 (FIG. 13) are controlled to obtain the desired impedance presented to the receive resonator 1318 as described in FIG. 13. For example, the word 0,0,0 may correspond to a lower level of impedance adjustment than the word 0,1,0, and the word 0,1,0 may correspond to a lower level of impedance adjustment than the word 1,1,0 and so on. As a further example of an exemplary embodiment, if the charge pump 1342 (FIG. 13, MSB (2)) provides a 2:1 voltage transformation, then the capacitor 1332 (FIG. 13, B(1)) might provide an approximate 1.41 voltage transformation, and the capacitor 1337 (FIG. 13, LSB(0)) might provide an approximate 1.19:1 voltage transformation.

Figure 16:
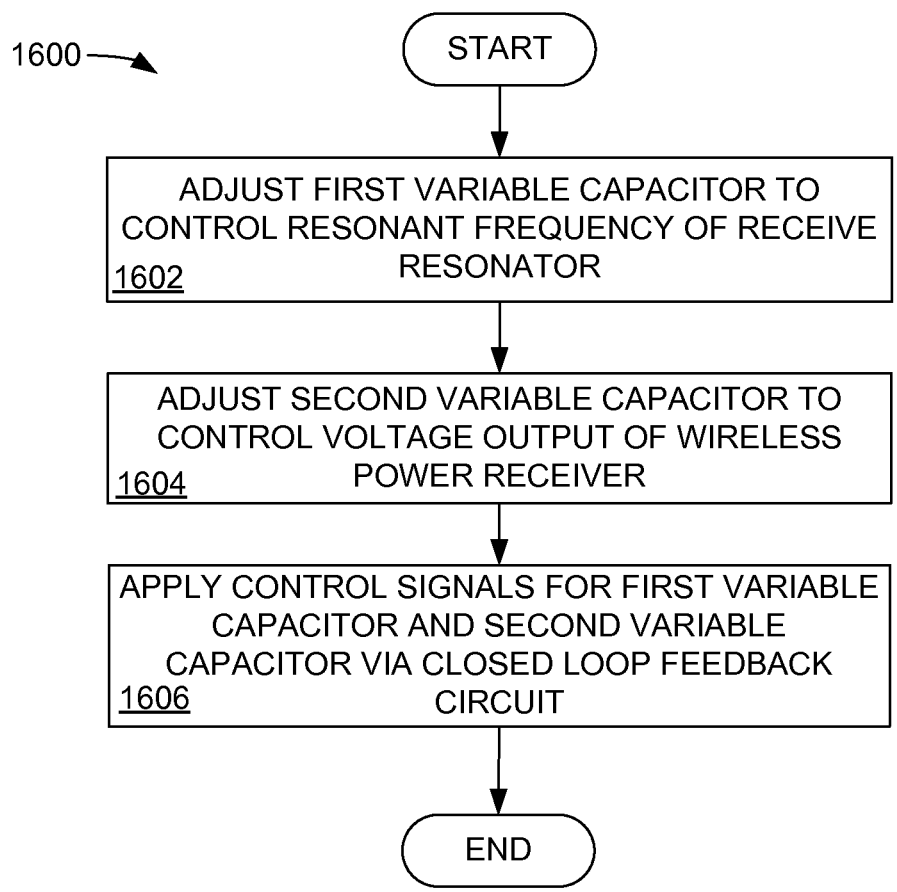
FIG. 16 is a flowchart illustrating an exemplary embodiment of a method for closed loop voltage control in a wireless power receiver.

FIG. 16 is a flowchart illustrating an exemplary embodiment of a method 1600 for closed loop voltage control in a wireless power receiver. The blocks in the method 1600 can be performed in or out of the order shown. The description of the method 1600 will relate to the various embodiments described herein.

In block 1602, a first variable capacitor is adjusted to control a resonant frequency of a receive resonator in a wireless power receiver.

In block 1604, a second variable capacitor is adjusted to control the voltage output of the wireless power receiver. In an exemplary embodiment, the adjustment of the first variable capacitor to control a resonant frequency of a receive resonator also affects the manner in which the second variable capacitor is controlled to adjust a voltage output of the wireless power receiver; and conversely, the adjustment of the second variable capacitor to control a voltage output of the wireless power receiver also affects the manner in which the first variable capacitor is controlled to adjust a resonant frequency of the receive resonator.

In block 1606, a closed loop feedback circuit applies control signals to the first variable capacitor and the second variable capacitor.

Figure 17:
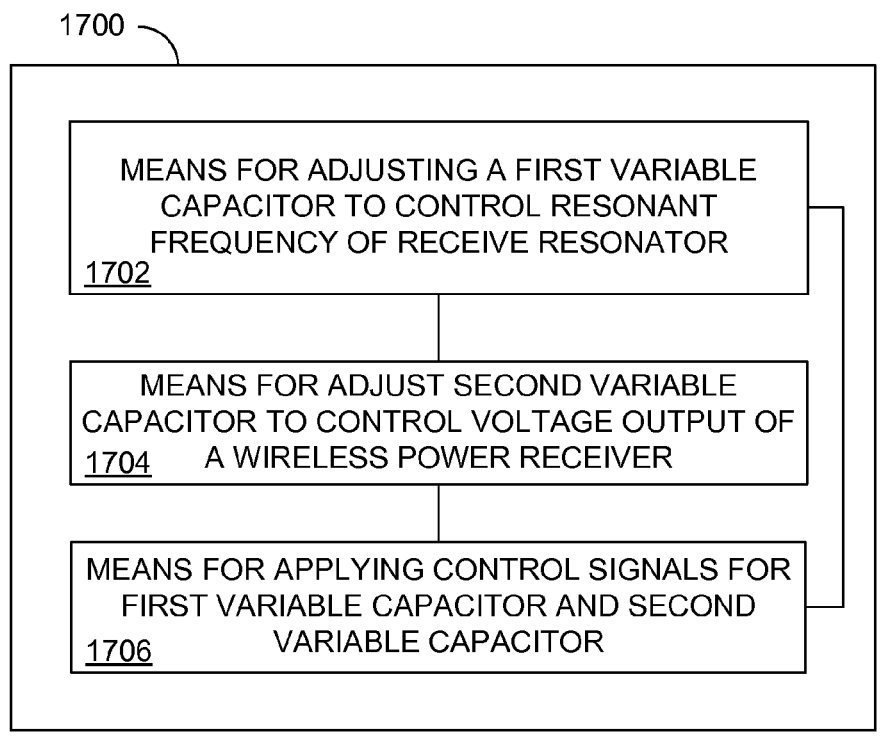
FIG. 17 is a functional block diagram of an apparatus for closed loop voltage control in a wireless power receiver.

FIG. 17 is a functional block diagram of an apparatus 1700 for closed loop voltage control in a wireless power receiver. The apparatus 1700 comprises means 1702 for adjusting a first variable capacitor to control a resonant frequency of a receive resonator in a wireless power receiver. In certain embodiments, the means 1702 for adjusting a first variable capacitor to control a resonant frequency of a receive resonator in a wireless power receiver can be configured to perform one or more of the function described in operation block 1602 of method 1600 (FIG. 16). In an exemplary embodiment, the means 1702 for adjusting a first variable capacitor to control a resonant frequency of a receive resonator in a wireless power receiver may comprise the receive circuitry described herein.

The apparatus 1700 further comprises means 1704 for adjusting a second variable capacitor to control the voltage output of a wireless power receiver. In certain embodiments, the means 1704 for adjusting a second variable capacitor to control the voltage output of a wireless power receiver can be configured to perform one or more of the function described in operation block 1604 of method 1600 (FIG. 16). In an exemplary embodiment, the means 1704 for adjusting a second variable capacitor to control the voltage output of a wireless power receiver may comprise the receive circuitry described herein.

The apparatus 1700 further comprises means 1706 for applying control signals for the first variable capacitor and the second variable capacitor. In certain embodiments, the means 1706 for applying control signals for the first variable capacitor and the second variable capacitor can be configured to perform one or more of the function described in operation block 1606 of method 1600 (FIG. 16). In an exemplary embodiment, the means 1706 for applying control signals for the first variable capacitor and the second variable capacitor may comprise the receive circuitry described herein.

Figure 18:
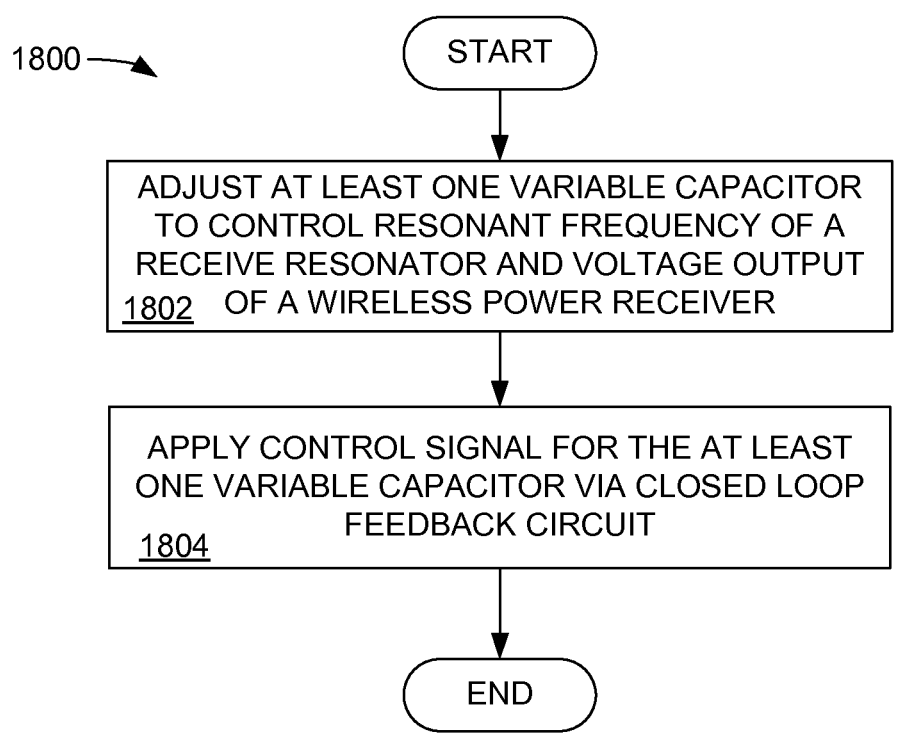
FIG. 18 is a flowchart illustrating an exemplary embodiment of a method for closed loop voltage control in a wireless power receiver.

FIG. 18 is a flowchart illustrating an exemplary embodiment of a method 1800 for closed loop voltage control in a wireless power receiver. The blocks in the method 1800 can be performed in or out of the order shown. The description of the method 1800 will relate to the various embodiments described herein.

In block 1802, at least one variable capacitor is adjusted to control a resonant frequency of a receive resonator and to control the voltage output in a wireless power receiver.

In block 1804, a closed loop feedback circuit applies control signals for the at least one variable capacitor.

Figure 19:
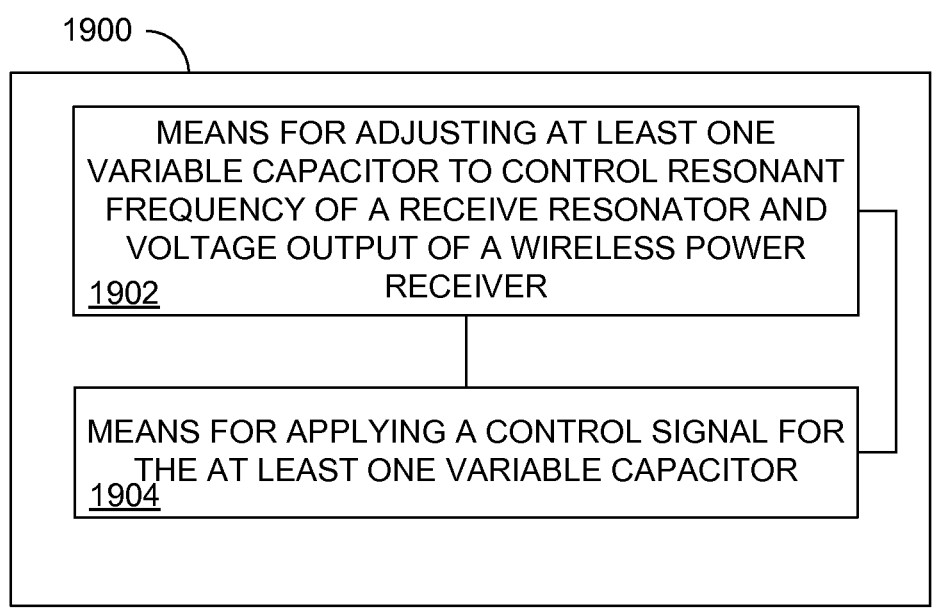
FIG. 19 is a functional block diagram of an apparatus for closed loop voltage control in a wireless power receiver.

FIG. 19 is a functional block diagram of an apparatus 1900 for closed loop voltage control in a wireless power receiver. The apparatus 1900 comprises means 1902 for adjusting at least one variable capacitor to control a resonant frequency of a receive resonator and to control the voltage output in a wireless power receiver. In certain embodiments, the means 1902 for adjusting at least one variable capacitor to control a resonant frequency of a receive resonator and to control the voltage output in a wireless power receiver can be configured to perform one or more of the function described in operation block 1802 of method 1800 (FIG. 18). In an exemplary embodiment, the means 1902 for adjusting at least one variable capacitor to control a resonant frequency of a receive resonator and to control the voltage output in a wireless power receiver may comprise the receive circuitry described herein.

The apparatus 1900 further comprises means 1904 for applying a control signal for the at least one variable capacitor. In certain embodiments, the means 1904 for applying a control signal for the at least one variable capacitor can be configured to perform one or more of the function described in operation block 1804 of method 1800 (FIG. 18). In an exemplary embodiment, the means 1904 for applying a control signal for the at least one variable capacitor may comprise the receive circuitry described herein.

Figure 20:
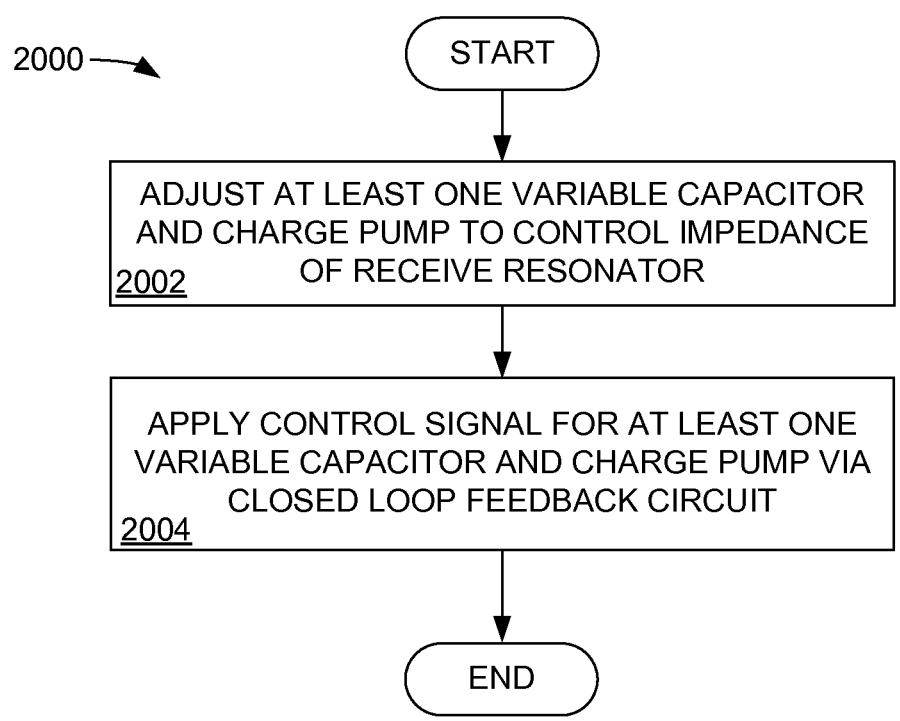
FIG. 20 is a flowchart illustrating an exemplary embodiment of a method for closed loop voltage control in a wireless power receiver.

FIG. 20 is a flowchart illustrating an exemplary embodiment of a method 2000 for closed loop voltage control in a wireless power receiver. The blocks in the method 2000 can be performed in or out of the order shown. The description of the method 2000 will relate to the various embodiments described herein.

In block 2002, at least one variable capacitor and a charge pump is adjusted to control an impedance of a receive resonator and to control the voltage output in a wireless power receiver.

In block 2004, a closed loop feedback circuit applies control signals for the at least one variable capacitor and for the charge pump.

Figure 21:
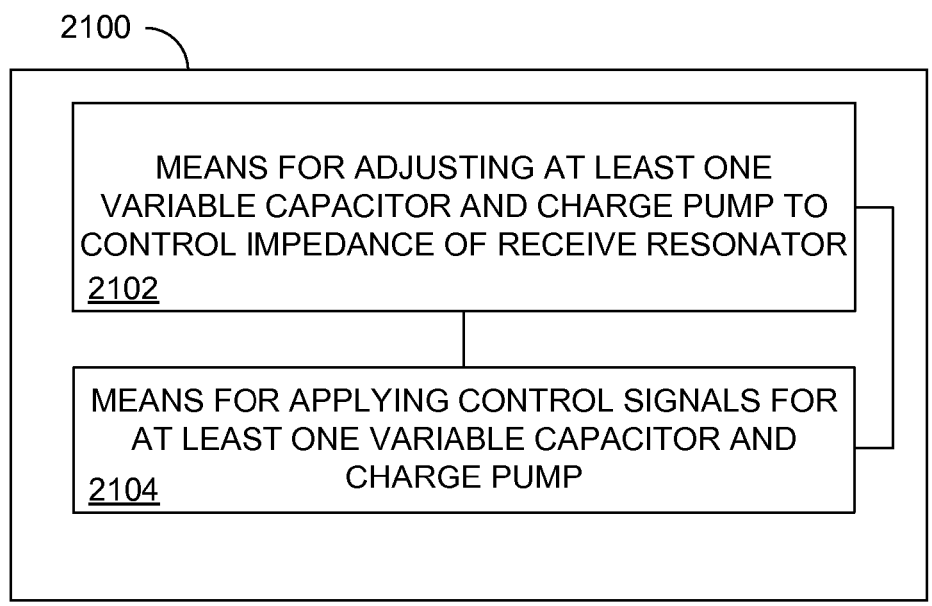
FIG. 21 is a functional block diagram of an apparatus for closed loop voltage control in a wireless power receiver.

FIG. 21 is a functional block diagram of an apparatus 2100 for closed loop voltage control in a wireless power receiver. The apparatus 2100 comprises means 2102 for adjusting at least one variable capacitor and a charge pump to control an impedance of a receive resonator and to control the voltage output in a wireless power receiver. In certain embodiments, the means 2102 for adjusting at least one variable capacitor and a charge pump to control an impedance of a receive resonator and to control the voltage output in a wireless power receiver can be configured to perform one or more of the function described in operation block 2002 of method 2000 (FIG. 20). In an exemplary embodiment, the means 2102 for adjusting at least one variable capacitor and a charge pump to control an impedance of a receive resonator and to control the voltage output in a wireless power receiver may comprise the receive circuitry described herein.

The apparatus 2100 further comprises means 2104 for applying a control signal for the at least one variable capacitor and the charge pump. In certain embodiments, the means 2104 for applying a control signal for the at least one variable capacitor and the charge pump can be configured to perform one or more of the function described in operation block 2004 of method 2000 (FIG. 20). In an exemplary embodiment, the means 2104 for applying a control signal for the at least one variable capacitor and the charge pump may comprise the receive circuitry described herein.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

In view of the disclosure above, one of ordinary skill in programming is able to write computer code or identify appropriate hardware and/or circuits to implement the disclosed invention without difficulty based on the flow charts and associated description in this specification, for example. Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the FIGS. which may illustrate various process flows.

In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium.

Disk and disc, as used herein, includes compact disc ("CD"), laser disc, optical disc, digital versatile disc ("DVD"), floppy disk and Blu-Ray disc where disks usually reproduce data magnetically, while discs reproduce data optically with lasers. Combinations of the above should also be included within the scope of computer-readable media.

Although selected aspects have been illustrated and described in detail, it will be understood that various substitutions and alterations may be made therein without departing from the spirit and scope of the present invention, as defined by the following claims.

The invention claimed is:

1. An apparatus for wirelessly receiving power via a wireless field generated by a transmitter, the apparatus comprising:
   a resonator configured to generate electrical current to power or charge a load based on a voltage induced in the resonator in response to the wireless field;
   a first variable capacitor electrically coupled to the resonator and configured to adjust a first capacitance of the first variable capacitor responsive to a first control signal;
   a second variable capacitor electrically coupled to the resonator and configured to adjust a second capacitance of the second variable capacitor responsive to a second control signal; and
   a control circuit configured to adjust and apply the first control signal and the second control signal to the first variable capacitor and the second variable capacitor, respectively, to adjust a resonant frequency of the resonator and a voltage output to the load based on an electrical characteristic indicative of a level of power output to the load, wherein the control circuit is configured to control the resonant frequency of the resonator by adjusting the first variable capacitor responsive to the voltage output of the load, a reference voltage and a phase difference of a signal across the resonator.

2. The apparatus of claim 1, wherein the control circuit comprises a closed loop feedback circuit configured to adjust the first variable capacitor and the second variable capacitor responsive to a reference signal, the reference signal comprising the reference voltage.

3. The apparatus of claim 1, wherein the second variable capacitor is configured to adjust the voltage output of the load.

4. The apparatus of claim 1, wherein the first variable capacitor and the second variable capacitor are each configured to provide a portion of a total capacitance, the total capacitance configured to simultaneously adjust the resonant frequency of the resonator and a voltage output of the load.

5. The apparatus of claim 4, wherein the portion of the total capacitance provided by the first variable capacitor and the second variable capacitor causes the resonator to remain at the resonant frequency as the load varies, and causes an impedance of the resonator to be maintained as real.

6. The apparatus of claim 1, wherein the control circuit is configured to control the voltage output by adjusting the second variable capacitor responsive to the voltage output of the load and the reference voltage.

7. The apparatus of claim 1, wherein the control circuit is configured to control the voltage output by adjusting the second variable capacitor responsive to the voltage output of the load and the reference voltage.

8. The apparatus of claim 4, wherein the control circuit is configured to control the resonant frequency of the resonator and the voltage output of a wireless power receiver responsive to the voltage output of the load and the reference voltage.

9. The apparatus of claim 8, wherein the portion of the total capacitance provided by the first variable capacitor is inversely proportional to the portion of the total capacitance provided by the second variable capacitor.

10. The apparatus of claim 1, wherein:
in response to an increasing voltage output, the second variable capacitor is adjusted to reduce the voltage output; and
the first variable capacitor is adjusted to reduce the electrical current in the resonator.

11. The apparatus of claim 1, wherein:
in response to a decreasing voltage output, the second variable capacitor is adjusted to increase the voltage output; and
the first variable capacitor is adjusted to increase the electrical current in the resonator.

12. A method for wirelessly receiving power via a wireless field generated by a transmitter, the method comprising:
generating an electrical current to power or charge a load based on a voltage induced in a resonator in response to the wireless field;
adjusting a first variable capacitance responsive to a first control signal;
adjusting a second variable capacitance responsive to a second control signal;
applying the first control signal and the second control signal to the first variable capacitance and the second variable capacitance, respectively, to control a resonant frequency of the resonator and a voltage output to the load based on an electrical characteristic indicative of a level of power output to the load by adjusting the first variable capacitance responsive to the voltage output to the load, a reference voltage and a phase difference of a signal across the resonator.

13. The method of claim 12, further comprising applying the first control signal and the second control signal responsive to a reference signal, the reference signal comprising the reference voltage.

14. The method of claim 12, further comprising adjusting the second variable capacitance to adjust the voltage output to the load.

15. The method of claim 12, further comprising adjusting the first variable capacitance and the second variable capacitance to provide a portion of a total capacitance, to simultaneously adjust the resonant frequency of the resonator and the voltage output to the load.

16. The method of claim 15, wherein the portion of the total capacitance provided by the first variable capacitance and the second variable capacitance causes the resonator to remain at the resonant frequency as the load varies, and causes an impedance of the resonator to be maintained as real.

17. The method of claim 14, further comprising controlling the voltage output to the load by adjusting the second variable capacitance responsive to the voltage output to the load and the reference voltage.

18. The method of claim 12, further comprising controlling the voltage output to the load by adjusting the second variable capacitance responsive to the voltage output to the load and the reference voltage.

19. The method of claim 15, further comprising controlling the resonant frequency of the resonator and the voltage output to the load responsive to the voltage output to the load and the reference voltage.

20. The method of claim 15, wherein the portion of the total capacitance provided by the first variable capacitance is inversely proportional to the portion of the total capacitance provided by the second variable capacitance.

21. The method of claim 12, further comprising:
adjusting the second variable capacitance to reduce the voltage output to the load in response to an increasing voltage output to the load; and
adjusting the first variable capacitance to reduce the electrical current in the resonator.

22. The method of claim 12, further comprising:
adjusting the second variable capacitance to increase the voltage output to the load in response to a decreasing voltage output to the load; and
adjusting the first variable capacitance to increase the electrical current in the resonator.

23. A device for wirelessly receiving power via a wireless field generated by a transmitter, comprising:
means for generating an electrical current to power or charge a load in response to the wireless field;
means for adjusting a first capacitance responsive to a first control signal;
means for adjusting a second capacitance responsive to a second control signal; and
means for applying the first control signal and the second control signal to the means for adjusting the first capacitance and the means for adjusting the second capacitance, respectively, to control a resonant frequency of the means for generating the electrical current and a voltage output to the load based on an electrical characteristic indicative of a level of power output to the load by adjusting the first variable capacitance responsive to the voltage output to the load, a reference voltage and a phase difference of a signal across the means for generating the electric current.

24. The device of claim 23, further comprising means for applying the first control signal and the second control signal responsive to a reference signal, the reference signal comprising the reference voltage.

25. An apparatus for wirelessly receiving power via a wireless field generated by a transmitter, the apparatus comprising:
a resonator configured to generate electrical current to power or charge a load based on a voltage induced in the resonator in response to the wireless field;
a first variable capacitor electrically coupled to the resonator and configured to adjust a first capacitance of the first variable capacitor responsive to a first control signal;
a second variable capacitor electrically coupled to the resonator and configured to adjust a second capacitance of the second variable capacitor responsive to a second control signal; and
a closed loop feedback circuit configured to adjust and apply the first control signal and the second control signal to the first variable capacitor and the second variable capacitor, respectively, to adjust a resonant frequency of the resonator and a voltage output to the load based on an electrical characteristic indicative of a level of power output to the load, a reference signal, and a phase difference of a signal across the resonator.

26. The apparatus of claim 25, wherein:
in response to an increasing voltage output, the second variable capacitor is adjusted to reduce the voltage output, and the first variable capacitor is adjusted to detune the resonator away from resonance; and
in response to a decreasing voltage output, the second variable capacitor is adjusted to increase the voltage output, and the first variable capacitor is adjusted tune the resonator closer to resonance.

* * * * *